United States Patent
Hethcock, Jr. et al.

(10) Patent No.: US 12,275,525 B2
(45) Date of Patent: Apr. 15, 2025

(54) NET EDGE COMPOSITE CORE SPLICES FOR AIRCRAFT WING

(71) Applicant: SIERRA NEVADA CORPORATION, Sparks, NV (US)

(72) Inventors: James Donn Hethcock, Jr., Colleyville, TX (US); Raymond Lester Humphries, Colleyville, TX (US); Matthew Barclay, Colleyville, TX (US)

(73) Assignee: SIERRA NEVADA CORPORATION, Sparks, NV (US)

( * ) Notice: Subject to any disclaimer, the term of this patent is extended or adjusted under 35 U.S.C. 154(b) by 889 days.

(21) Appl. No.: 17/252,710

(22) PCT Filed: Dec. 12, 2018

(86) PCT No.: PCT/US2018/065125
§ 371 (c)(1),
(2) Date: Dec. 15, 2020

(87) PCT Pub. No.: WO2019/245599
PCT Pub. Date: Dec. 26, 2019

(65) Prior Publication Data
US 2021/0155337 A1    May 27, 2021

Related U.S. Application Data

(60) Provisional application No. 62/688,080, filed on Jun. 21, 2018.

(51) Int. Cl.
*B32B 3/12* (2006.01)
*B29C 65/00* (2006.01)
(Continued)

(52) U.S. Cl.
CPC .......... *B64C 3/20* (2013.01); *B29C 66/72525* (2013.01); *B29C 70/68* (2013.01);
(Continued)

(58) Field of Classification Search
CPC ....... B29C 65/02; B29C 65/48; B29C 65/483; B29C 65/4835; B29C 66/022;
(Continued)

(56) References Cited

U.S. PATENT DOCUMENTS 1,376,785 A     5/1921   Sellmer
D97,652 S      11/1935   Swanson
(Continued)

FOREIGN PATENT DOCUMENTS

EP    0891858 A2   1/1999
EP    1338506 A1   8/2003
(Continued)

OTHER PUBLICATIONS

International Search Report for PCT International Application No. PCT/US18/65125, mailed May 3, 2019 (4 pp.).
(Continued)

*Primary Examiner* — Michael A Tolin
(74) *Attorney, Agent, or Firm* — HOLLAND & HART LLP

(57) ABSTRACT

Methods and related structures to splice two sizes of cores in a manner to directly interface the facets of the cells and avoid the common practice of using fillers, casting materials, and expanding adhesives is useful to optimize the specific strength of the design and minimize the weight while maximizing the load carrying capability of the structure and to allow the core to vent moisture and other gasses.

7 Claims, 10 Drawing Sheets

(51) Int. Cl.
- *B29C 70/68* (2006.01)
- *B32B 3/28* (2006.01)
- *B32B 5/14* (2006.01)
- *B32B 7/02* (2019.01)
- *B32B 7/12* (2006.01)
- *B64C 3/20* (2006.01)
- *B29C 70/32* (2006.01)
- *B29L 31/30* (2006.01)

(52) U.S. Cl.
CPC .......... *B32B 3/12* (2013.01); *B32B 3/28* (2013.01); *B32B 5/142* (2013.01); *B32B 7/02* (2013.01); *B32B 7/12* (2013.01); *B29C 70/32* (2013.01); *B29L 2031/3085* (2013.01); *B32B 2250/40* (2013.01); *B32B 2260/021* (2013.01); *B32B 2260/046* (2013.01); *B32B 2307/724* (2013.01); *B32B 2307/726* (2013.01); *B32B 2307/7375* (2023.05); *B32B 2605/18* (2013.01)

(58) Field of Classification Search
CPC ............ B29C 66/02245; B29C 66/026; B29C 66/112; B29C 66/1122; B29C 66/114; B29C 66/1142; B29C 66/229; B29C 66/43; B29C 66/71; B29C 66/721; B29C 66/725; B29C 66/7252; B29C 66/72521; B29C 66/72525; B29C 66/7254; B29C 70/32; B29C 70/68; B29D 24/005; B29D 99/0089; B29K 2031/00; B29K 2063/00; B29K 2079/08; B29L 2031/3076; B29L 2031/3085; B29L 2031/608; B32B 3/06; B32B 3/12; B32B 3/263; B32B 3/28; B32B 5/142; B32B 5/18; B32B 5/24; B32B 5/26; B32B 7/02; B32B 7/022; B32B 7/12; B32B 7/14; B32B 37/146; B32B 2250/40; B32B 2260/021; B32B 2260/023; B32B 2260/046; B32B 2262/10; B32B 2262/101; B32B 2262/106; B32B 2305/024; B32B 2307/542; B32B 2307/546; B32B 2307/724; B32B 2307/726; B32B 2307/732; B32B 2307/7375; B32B 2603/00; B32B 2605/08; B32B 2605/16; B32B 2605/18; B64C 3/18; B64C 3/20; B64C 3/24; Y02T 50/40

See application file for complete search history.

(56) References Cited

U.S. PATENT DOCUMENTS

| | | | |
|---|---|---|---|
| 2,166,564 A | 7/1939 | Atwood et al. | |
| D133,634 S | 9/1942 | Hurzzard et al. | |
| D136,664 S | 11/1943 | White | |
| D143,864 S | 2/1946 | Northrop | |
| 2,501,920 A | 3/1950 | Steigel | |
| 2,700,632 A * | 1/1955 | Ackerlind | E04C 2/365 428/116 |
| 2,938,680 A | 5/1960 | Greene et al. | |
| 3,017,139 A | 1/1962 | Binder | |
| D192,583 S | 4/1962 | Walker et al. | |
| 3,049,320 A | 8/1962 | Fletcher | |
| D194,645 S | 2/1963 | Raspet | |
| D197,933 S | 4/1964 | Sumner | |
| D201,284 S | 6/1965 | Bross et al. | |
| 3,310,262 A | 3/1967 | Robins et al. | |
| 3,360,217 A | 12/1967 | Trotter | |
| 3,392,225 A | 7/1968 | Phelan | |
| 3,415,467 A | 12/1968 | Barringer | |
| 3,438,597 A | 4/1969 | Kasper | |
| D218,856 S | 9/1970 | Fellers et al. | |
| D218,857 S | 9/1970 | Walter et al. | |
| 3,564,134 A | 2/1971 | Rue et al. | |
| D220,982 S | 6/1971 | Webb | |
| D221,696 S | 8/1971 | Kirivka | |
| D231,603 S | 5/1974 | Kirivka | |
| D231,604 S | 5/1974 | Kirivka | |
| 3,916,560 A | 11/1975 | Becker | |
| 4,008,867 A | 2/1977 | Kaniut | |
| D246,168 S | 10/1977 | Landrus | |
| 4,206,895 A | 6/1980 | Olez | |
| D256,347 S | 8/1980 | Mccomas | |
| D256,905 S | 9/1980 | Mccomas et al. | |
| D257,338 S | 10/1980 | Mccomas et al. | |
| 4,304,376 A * | 12/1981 | Hilton | B64C 3/20 428/116 |
| D264,454 S | 5/1982 | Snyder | |
| 4,372,507 A | 2/1983 | Denniston | |
| 4,415,132 A | 11/1983 | Shirk | |
| D274,510 S | 7/1984 | Mccomas et al. | |
| D281,680 S | 12/1985 | Henderson | |
| 4,569,493 A | 2/1986 | Burhans, Jr. | |
| 4,662,587 A | 5/1987 | Whitener | |
| 4,687,691 A | 8/1987 | Kay | |
| 4,710,708 A | 12/1987 | Rorden et al. | |
| 4,712,352 A | 12/1987 | Low | |
| D298,026 S | 10/1988 | Judge | |
| 4,811,540 A | 3/1989 | Kallies et al. | |
| 4,869,443 A | 9/1989 | Skow | |
| 4,896,846 A | 1/1990 | Strom | |
| 4,966,802 A | 10/1990 | Hertzberg | |
| 4,979,699 A | 12/1990 | Tindell | |
| 5,039,032 A | 8/1991 | Rudolph | |
| D319,805 S | 9/1991 | Wiegert | |
| D323,315 S | 1/1992 | Haga | |
| D326,255 S | 5/1992 | Graham et al. | |
| 5,111,400 A | 5/1992 | Yoder | |
| 5,115,996 A | 5/1992 | Moller | |
| 5,118,052 A | 6/1992 | Alvarez Calderon | |
| D332,080 S | 12/1992 | Sandusky et al. | |
| 5,192,037 A | 3/1993 | Moorefield | |
| 5,274,846 A | 1/1994 | Kolsky | |
| 5,379,969 A | 1/1995 | Marx et al. | |
| D356,990 S | 4/1995 | Weir et al. | |
| 5,407,150 A | 4/1995 | Sadleir | |
| 5,425,515 A | 6/1995 | Hirose | |
| 5,437,936 A * | 8/1995 | Johnson | B21D 47/00 428/603 |
| 5,460,865 A * | 10/1995 | Tsotsis | E04C 2/365 428/116 |
| 5,496,001 A | 3/1996 | Skow | |
| D371,105 S | 6/1996 | Graham et al. | |
| 5,567,500 A | 10/1996 | Marshall et al. | |
| 5,574,648 A | 11/1996 | Pilley | |
| 5,716,032 A | 2/1998 | Mcingvale | |
| D392,937 S | 3/1998 | Brichard et al. | |
| 5,735,486 A | 4/1998 | Piening et al. | |
| 5,842,666 A | 12/1998 | Gerhardt et al. | |
| 5,890,079 A | 3/1999 | Levine | |
| 5,922,446 A | 7/1999 | Piening et al. | |
| 5,924,649 A | 7/1999 | Piening et al. | |
| 5,927,645 A | 7/1999 | Latz | |
| 5,984,229 A | 11/1999 | Hollowell et al. | |
| D418,105 S | 12/1999 | Margaritoff | |
| D418,805 S | 1/2000 | Cycon et al. | |
| D431,522 S | 10/2000 | Fujino | |
| 6,147,980 A | 11/2000 | Yee et al. | |
| 6,173,159 B1 | 1/2001 | Wright et al. | |
| 6,176,451 B1 | 1/2001 | Drymon | |
| D439,876 S | 4/2001 | Simonov et al. | |
| 6,260,797 B1 | 7/2001 | Palmer | |
| D446,764 S | 8/2001 | Panatov et al. | |
| 6,338,011 B1 | 1/2002 | Furst et al. | |
| 6,355,337 B1 | 3/2002 | Piening et al. | |
| 6,394,722 B1 | 5/2002 | Kunt et al. | |
| D458,577 S | 6/2002 | Han | |
| D464,604 S | 10/2002 | Jamgarov | |
| D467,217 S | 12/2002 | Andreyko | |
| D468,255 S | 1/2003 | Gopalaswami et al. | |
| 6,520,706 B1 | 2/2003 | Mckague, Jr. et al. | |

(56) References Cited

U.S. PATENT DOCUMENTS

| | | |
|---|---|---|
| 6,677,888 B2 | 1/2004 | Roy |
| 6,799,114 B2 | 9/2004 | Etnyre |
| 6,806,829 B2 | 10/2004 | Smith et al. |
| 6,857,601 B2 | 2/2005 | Akahori |
| 6,908,061 B2 | 6/2005 | Akahori |
| 6,995,688 B2 | 2/2006 | Reynolds |
| 7,037,568 B1 | 5/2006 | Rogers et al. |
| 7,070,146 B2 | 7/2006 | Morgenstern et al. |
| 7,130,741 B2 | 10/2006 | Bodin et al. |
| 7,228,232 B2 | 6/2007 | Bodin et al. |
| 7,252,263 B1 | 8/2007 | Hagemeister et al. |
| 7,269,513 B2 | 9/2007 | Herwitz |
| D613,202 S | 4/2010 | Rodriquez et al. |
| D621,774 S | 8/2010 | Betsch |
| 7,782,256 B2 | 8/2010 | Smith |
| D629,737 S | 12/2010 | Betsch |
| D649,506 S | 11/2011 | Morelli |
| D651,156 S | 12/2011 | Gundlach |
| 8,089,033 B2 | 1/2012 | Zank et al. |
| D665,331 S | 8/2012 | Sands |
| 8,342,447 B2 | 1/2013 | Etling |
| 8,444,082 B1 | 5/2013 | Foch |
| D690,254 S | 9/2013 | Manzhelii |
| 8,544,794 B2 | 10/2013 | Ciprian |
| D708,563 S | 7/2014 | Colten |
| D710,782 S | 8/2014 | Cummings |
| D713,321 S | 9/2014 | Cummings |
| D713,774 S | 9/2014 | Tritschler et al. |
| D717,227 S | 11/2014 | Herzberger et al. |
| D729,694 S | 5/2015 | Earon |
| D734,402 S | 7/2015 | Reznik |
| D739,807 S | 9/2015 | Strand et al. |
| 9,156,239 B2 | 10/2015 | Hethcock et al. |
| 9,168,996 B2 | 10/2015 | Haensch et al. |
| D743,868 S | 11/2015 | Cummings et al. |
| 9,180,974 B2 | 11/2015 | Pogosyan et al. |
| 9,284,046 B2 | 3/2016 | Lucchesini et al. |
| 9,387,926 B2 | 7/2016 | Sommer |
| 9,452,820 B1 | 9/2016 | Wirth |
| 9,505,484 B1 | 11/2016 | Al-Sabah |
| 9,507,346 B1 | 11/2016 | Levinson et al. |
| 9,527,596 B1 | 12/2016 | Adams |
| 9,545,991 B1 | 1/2017 | Alley et al. |
| 9,681,527 B2 | 6/2017 | Foltz et al. |
| 9,713,913 B2 | 7/2017 | Hethcock et al. |
| D795,160 S | 8/2017 | Koppenwallner |
| 9,725,155 B2 | 8/2017 | Miller et al. |
| 9,777,502 B2 | 10/2017 | Curlander et al. |
| 9,783,284 B2 | 10/2017 | Townsend et al. |
| D801,856 S | 11/2017 | Zhou |
| D803,724 S | 11/2017 | Zhou |
| 9,815,545 B1 | 11/2017 | Steer |
| D807,273 S | 1/2018 | Koppenwallner |
| D808,328 S | 1/2018 | Ivans et al. |
| D809,970 S | 2/2018 | Zhou |
| D810,621 S | 2/2018 | Sadek |
| D813,143 S | 3/2018 | Belik et al. |
| D824,804 S | 8/2018 | Tian |
| 10,042,359 B1 | 8/2018 | Konrardy et al. |
| 10,046,850 B2 | 8/2018 | Gamble et al. |
| 10,124,880 B1 | 11/2018 | Ellzey et al. |
| 10,124,890 B2 | 11/2018 | Sada-Salinas et al. |
| 10,207,793 B2 | 2/2019 | Gonzalez et al. |
| 10,706,729 B2 | 7/2020 | Cao et al. |
| 10,710,710 B2 | 7/2020 | Price |
| 10,974,809 B2 | 4/2021 | Finklea et al. |
| 2001/0031350 A1* | 10/2001 | Day ............... B29C 70/547 428/105 |
| 2002/0066825 A1 | 6/2002 | Miralles et al. |
| 2002/0075179 A1 | 6/2002 | Hudson et al. |
| 2003/0089820 A1 | 5/2003 | Martorana et al. |
| 2003/0094536 A1 | 5/2003 | Labiche |
| 2003/0114115 A1 | 6/2003 | Overy et al. |
| 2004/0011927 A1 | 1/2004 | Christman et al. |
| 2004/0048027 A1 | 3/2004 | Hayes et al. |
| 2004/0148067 A1 | 7/2004 | Griffith et al. |
| 2004/0159227 A1 | 8/2004 | Richards |
| 2004/0232285 A1 | 11/2004 | Akahori |
| 2005/0029402 A1 | 2/2005 | Lucchesini et al. |
| 2005/0045763 A1 | 3/2005 | Morgenstern et al. |
| 2005/0116116 A1 | 6/2005 | Morgenstern |
| 2005/0121555 A1 | 6/2005 | Morgenstern et al. |
| 2005/0200501 A1 | 9/2005 | Smith |
| 2005/0274845 A1 | 12/2005 | Miller et al. |
| 2006/0032978 A1 | 2/2006 | Matos et al. |
| 2006/0185305 A1 | 8/2006 | Schaffer |
| 2006/0197700 A1 | 9/2006 | Stevens et al. |
| 2006/0253254 A1 | 11/2006 | Herwitz |
| 2007/0222665 A1 | 9/2007 | Koeneman |
| 2007/0252760 A1 | 11/2007 | Smith et al. |
| 2007/0262207 A1 | 11/2007 | Morgenstern et al. |
| 2008/0033604 A1 | 2/2008 | Margolin |
| 2008/0055149 A1 | 3/2008 | Rees et al. |
| 2008/0158041 A1 | 7/2008 | Crudeli et al. |
| 2008/0191942 A1 | 8/2008 | Smith et al. |
| 2008/0201024 A1 | 8/2008 | Matos |
| 2008/0213034 A1 | 9/2008 | Wood et al. |
| 2008/0215204 A1 | 9/2008 | Roy et al. |
| 2008/0221745 A1 | 9/2008 | Diamandis et al. |
| 2008/0243314 A1 | 10/2008 | Ridenour |
| 2008/0255711 A1 | 10/2008 | Matos |
| 2009/0012657 A1 | 1/2009 | Knotts et al. |
| 2009/0026804 A1 | 1/2009 | Ciprian |
| 2009/0202780 A1* | 8/2009 | Loszewski ............ B29C 70/30 156/196 |
| 2009/0206196 A1 | 8/2009 | Parks et al. |
| 2009/0222148 A1 | 9/2009 | Knotts et al. |
| 2009/0302151 A1 | 12/2009 | Holmes |
| 2010/0004799 A1 | 1/2010 | Drouin et al. |
| 2010/0006702 A1 | 1/2010 | Fogarty et al. |
| 2010/0051742 A1 | 3/2010 | Schweighart et al. |
| 2010/0224732 A1 | 9/2010 | Olson et al. |
| 2010/0264260 A1 | 10/2010 | Hammerquist |
| 2010/0320325 A1 | 12/2010 | Parikh et al. |
| 2011/0095572 A1 | 4/2011 | Wary |
| 2011/0130913 A1 | 6/2011 | Duggan et al. |
| 2011/0135887 A1 | 6/2011 | Saff et al. |
| 2011/0315300 A1 | 12/2011 | Weidmann et al. |
| 2012/0021165 A1 | 1/2012 | Hethcock et al. |
| 2012/0043429 A1 | 2/2012 | Tracy et al. |
| 2012/0205490 A1 | 8/2012 | Whitehouse et al. |
| 2012/0234979 A1 | 9/2012 | Smith |
| 2012/0280080 A1 | 11/2012 | Lubenow et al. |
| 2012/0292436 A1 | 11/2012 | Karem |
| 2013/0196593 A1 | 8/2013 | Roper et al. |
| 2013/0299636 A1 | 11/2013 | Durand et al. |
| 2014/0070056 A1 | 3/2014 | Merlo et al. |
| 2014/0120298 A1 | 5/2014 | Thiagarajan et al. |
| 2014/0141769 A1 | 5/2014 | Brisebois et al. |
| 2014/0145027 A1 | 5/2014 | Pogosyan et al. |
| 2014/0209744 A1 | 7/2014 | Marcoe et al. |
| 2014/0265043 A1 | 9/2014 | Oldroyd et al. |
| 2014/0281534 A1 | 9/2014 | Mccormack et al. |
| 2014/0293497 A1 | 10/2014 | Foltz et al. |
| 2014/0295123 A1 | 10/2014 | Mizuno et al. |
| 2014/0301856 A1 | 10/2014 | Oldroyd et al. |
| 2015/0008280 A1 | 1/2015 | Smoker |
| 2015/0032293 A1 | 1/2015 | O'Neill et al. |
| 2015/0036514 A1 | 2/2015 | Zhu et al. |
| 2015/0102155 A1 | 4/2015 | Krastev |
| 2015/0174819 A1* | 6/2015 | Hethcock ............ B29C 66/8126 156/272.2 |
| 2015/0266578 A1 | 9/2015 | Elkins et al. |
| 2015/0293845 A1 | 10/2015 | Hsu et al. |
| 2015/0360764 A1 | 12/2015 | Eales |
| 2015/0362005 A1 | 12/2015 | Meyers |
| 2016/0137307 A1 | 5/2016 | Fernandez |
| 2016/0155339 A1 | 6/2016 | Saad et al. |
| 2016/0185449 A1 | 6/2016 | Baker |
| 2016/0266733 A1 | 9/2016 | Alon et al. |
| 2016/0311190 A1 | 10/2016 | Hundley et al. |
| 2016/0340021 A1 | 11/2016 | Zhang et al. |
| 2016/0347476 A1 | 12/2016 | Andryukov |
| 2017/0001724 A1 | 1/2017 | Yates |

(56) References Cited

U.S. PATENT DOCUMENTS

| | | | |
|---|---|---|---|
| 2017/0182730 | A1 | 6/2017 | Kendrick et al. |
| 2017/0225769 | A1 | 8/2017 | Carlson et al. |
| 2017/0355441 | A1 | 12/2017 | Winkelmann et al. |
| 2017/0369150 | A1 | 12/2017 | Finklea et al. |
| 2018/0050788 | A1 | 2/2018 | Kismarton et al. |
| 2018/0072400 | A1 | 3/2018 | Deobald et al. |
| 2018/0136651 | A1 | 5/2018 | Levinson et al. |
| 2018/0201008 | A1 | 7/2018 | Pierce et al. |
| 2018/0229443 | A1 | 8/2018 | Pham et al. |
| 2018/0231977 | A1 | 8/2018 | Uno |
| 2019/0011912 | A1 | 1/2019 | Lockwood et al. |
| 2019/0186918 | A1 | 6/2019 | Suen et al. |
| 2019/0232602 | A1 | 8/2019 | Wolf et al. |
| 2020/0012274 | A1 | 1/2020 | Kamiya et al. |
| 2020/0020412 | A1 | 1/2020 | Biberidis et al. |
| 2020/0254713 | A1 | 8/2020 | Oldenburg et al. |
| 2020/0266857 | A1 | 8/2020 | Hwang et al. |
| 2020/0314916 | A1 | 10/2020 | Park et al. |
| 2020/0404569 | A1 | 12/2020 | Cho et al. |
| 2021/0061027 | A1 | 3/2021 | Da et al. |
| 2021/0206382 | A1 | 7/2021 | Nakada |
| 2022/0089181 | A1 | 3/2022 | Gross et al. |
| 2022/0126864 | A1 | 4/2022 | Moustafa et al. |

FOREIGN PATENT DOCUMENTS

| | | | |
|---|---|---|---|
| EP | 1884908 | A2 | 2/2008 |
| EP | 2708463 | | 3/2014 |
| WO | 2014/065718 | A1 | 5/2014 |
| WO | 2016209889 | A1 | 12/2016 |
| WO | 2017/134459 | A1 | 8/2017 |

OTHER PUBLICATIONS

"International Search Report and Written Opinion of the International Searching Authority," issued in connection with Int'l Appl. No. PCT/US09/34088, dated Dec. 14, 2009 (7 pages).

"International Search Report and Written Opinion of the International Searching Authority," issued in connection with Int'l Appl. No. PCT/US19/36827, dated Oct. 8, 2019 (11 pages).

"International Search Report and Written Opinion of the International Searching Authority," issued in connection with Int'l Appl. No. PCT/US21/48304, dated Dec. 1, 2021 (10 pages).

Airpower Classics; F-5; Dec. 2012; Air Force Magazine; p. 72 (Year: 2012).

Bekdil, B. E., "Turkey Chooses Indigenous Jet-engine Version Basic Trainer Aircraft," Military and Commercial Technology, available at https://thaimilitaryandasianregion.blogspot.com/2017/11/turkey-chooses-indigenous-jet-engine.html, Nov. 23, 2017 (2 pp.).

Burkhard Domke, MIG-29G Fulcrum-A, Jun. 2000; https://b-domke.de/Aviationimages/Fulcrum/3524.html (Year: 2000).

Butler, A., "Textron Unveils Scorpion Light Attack, Reece Jet," Aviation Week, available at https://aviationweek.com/defense-space/textron-unveils-scorpion-light-attack-recce-j et, Sep. 16, 2013 (4 pp.).

Call Systems Technology, Products, "AlarmCall Paging," https://www.call-systems.com/products/alarmcall-paging/, dated Jun. 26, 2018 (available at least as early as Jun. 2017).

Colin Cutler, Here's How Leading Edge Slats Get You Off The Ground, Jul. 26, 2018, boldmethod; https://www.boldmethod.com/learn-to-fly/aircraft-systems/here-is-how-leading-edge-slats-work-to-get-you-off-the-ground/ (Year: 2018).

Coyote UAS; https://www.raytheon.com/capabilities/products/coyote; one (1) page; available prior to May 30, 2016.

Drew, James; USAF reaffirms ambitions T-X sustained-g requirement; Jul. 11, 2015; FlightGlobal.com (Year: 2015).

European Aviation Safety Agency; Type-Certificate Data Sheet; Nov. 17, 2015 (Year: 2015).

European Patent Office, "European search report," issued in connection with European Patent Application No. 19822274.7 dated Feb. 23, 2022 (9 pages).

Hartford, Robin, UAT Puts UAVs on the Radar,www.mitre.org/news/digest/aviation/06 08/av uat.html, Jun. 2008, p. 1-3.

Hillaker, H. J., "Design Concept and Rationale . . . for YF-16," Presentation, available at https://www.codeonemagazine.com/f16_article.html?item id=131 1972 (61 pp.), Month of Publication Unknown.

Hoerner, S. F., et al., "Fluid-Dynamic Lift," Published by Mrs. Liselotte A. Hoerner, 1985 (482 pp.), Month of Publication Unknown.

Information about Related Patents, Patent Applications, and Patent Office Proceedings see the section below having the same title, Date of Publication Unknown.

Information Submitted in Parent Patent Applications, see MPEP 609.02 and the section below having the same title, Date of Publication Unknown.

Javelin Advanced Jet Trainer (AJT), Airforce Technology, available at https://www.airforce-technology.com/projects/javelin-ait/, available at least as early as Dec. 18, 2017, (8 pp.).

Lachmann, C; Experiments with Slotted Wings; Nov. 1921; National Advisory Committee for Aeronautics; No. 71 (Year: 1921), Month of Publication Unknown.

McDonnell Dougla F/A-18 Hornet, Wikipedia, available at https://en.wikipedia.org/wiki/McDonnell_Douglas_F/A-18_Hornet, available at least as early as Dec. 18, 2017 (30 pp.).

Military and Commercial Tech, by Hurjet. dated Nov. 23, 2017. found online [May 7, 2019] https://thaimilitaryandasianregion.blogspot.com/2017/11/turkey-chooses-indigenous-jet-engine.html.

Military Aviation, The Mikoyan MIG-29 'Fulcrum-A' (9-12), 2006 https://sirviper.com/index.php?page=fighters/mig-29/mig-29a (Year: 2006), Month of Publication Unknown.

Nikolic, Vojin R. "Movable Tip Strakes and Wing Aerodynamics." Journal of Aircraft, vol. 42, No. 6, Nov.-Dec. 2005, pp. 1418-1426, https://doi.org/10.2514/1.4615. (Year: 2005).

PCT International Preliminary Report on Patentability and Written Opinion of the International Search Authority for related PCT/US2009/034088, dated Aug. 17, 2010, 5 pages.

Pike, John; F-5 Freedom Fighter/ Tiger; Dec. 27, 1999; FAS Military Analysis Network; https://fas.org/man/dod-101/sys/ac/f-5.htm (Year: 1999).

Poland Developing Grot-2 Airplane With a Motor-Sich Engine, Defense Express, available at https://old.defence-ua.com/index.php/en/news/688-poland-developing-grot-2-airplane-with-a-motor-sich-engine, Mar. 22, 2016 (3 pp.).

Schmitt et al., "Perception-Oriented Cooperation for Multiple UAVs in a Perception Management Framework," 2016 IEEE/AIAA 35th Digital Avionics Systems Conference (DASC), pp. 1-10, 2016 (10 pp.), Month of Publication Unknown.

Sierra Nevada Corp., TAI Team to Offer Freedom Trainer for T-X, Aviation Week, available at https://aviationweek.com/defense-space/sierra-nevada-corp-tai-team-offer-freedom-trainer-t-x, Dec. 16, 2016 (3 pp.).

Strain, Robert, A Lightweight, Low-Cost ADS-B System for UAS Applications, Distribution Unlimited Case 07-0634, 2007, p. 1-9, Month of Publication Unknown.

Strain, Robert, Lightweight Beacon System for UAS and Other Aviation Applications, Mitre Corporation, 2007, p. 1-9, Month of Publication Unknown.

Tetron Unveils Scorpion Light Attack, Recce Jet, Aviation Week & Space Technology, http://aviationweek.com/awin/textron-unveils-scorpion-light-attack-recce-jet (Sep. 16, 2013).

Textron Airland's Scorpion: A Smart Gamble, Center for International Maritime Security, http://cimsec.org/textron-airlands-scorpion-a-smart-gamble/20979 (Jan. 15, 2016).

US Department of Transportation Federal Aviation Administration, Pilot's Handbook of Aeronautical Knowledge, 2016, FAA, Chapter 5 p. 5-21-5-42 https://www.faa.gov/sites/faa.gov/files/2022-03/pilot_handbook.pdf (Year: 2016). Month of Publication Unknown.

Van Dyk, D. J., "Textron Airland's Scorpion: A Smart Gamble," Center for International Maritime Security, available at https://cimsec.org/textron-airlands-scorpion-a-smart- gamble/, Jan. 15, 2016 (8 pp.).

(56) References Cited

OTHER PUBLICATIONS

WAFF—World Armed Forces Forum, post by Nutuk, available at https://www.tapatalk.com/groups/worldarmedforcesfomm/sierra-nevada-corp-tai-team-to-offer-freedom-train-1231764.html, Dec. 16, 2016 (12 pp.).
Wikipedia, Cobra maneuver, Mar. 13, 2022 (Year: 2022).
Wikipedia, Mikoyan MiG-29, Apr. 4, 2022 (Year: 2022).
Wikipedia, Strake (aeronautics), Aug. 9, 2017 (Year: 2017).
World Armed Forces Forum, post by Nutuk. dated Dec. 16, 2016. found online [May 7, 2019] https://www.tapatalk.com/groups/worldarmedforcesforum/sierra-nevada-corp-tai-team-to-offer-freedom-train-t231764.html.
European Search Report from corresponding EP Pat. App. 18923054.3, Feb. 15, 2022 (7 pp.).

\* cited by examiner

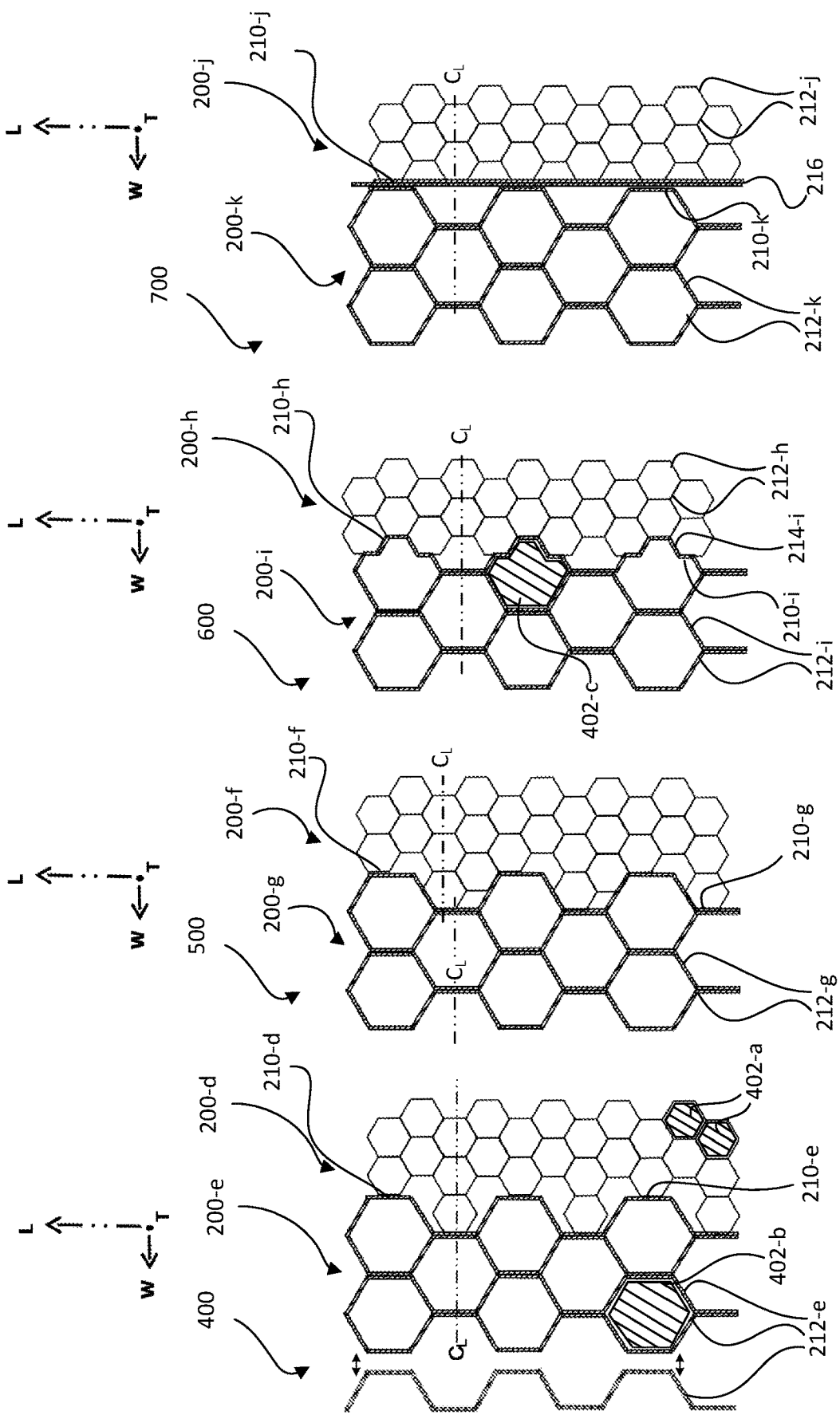

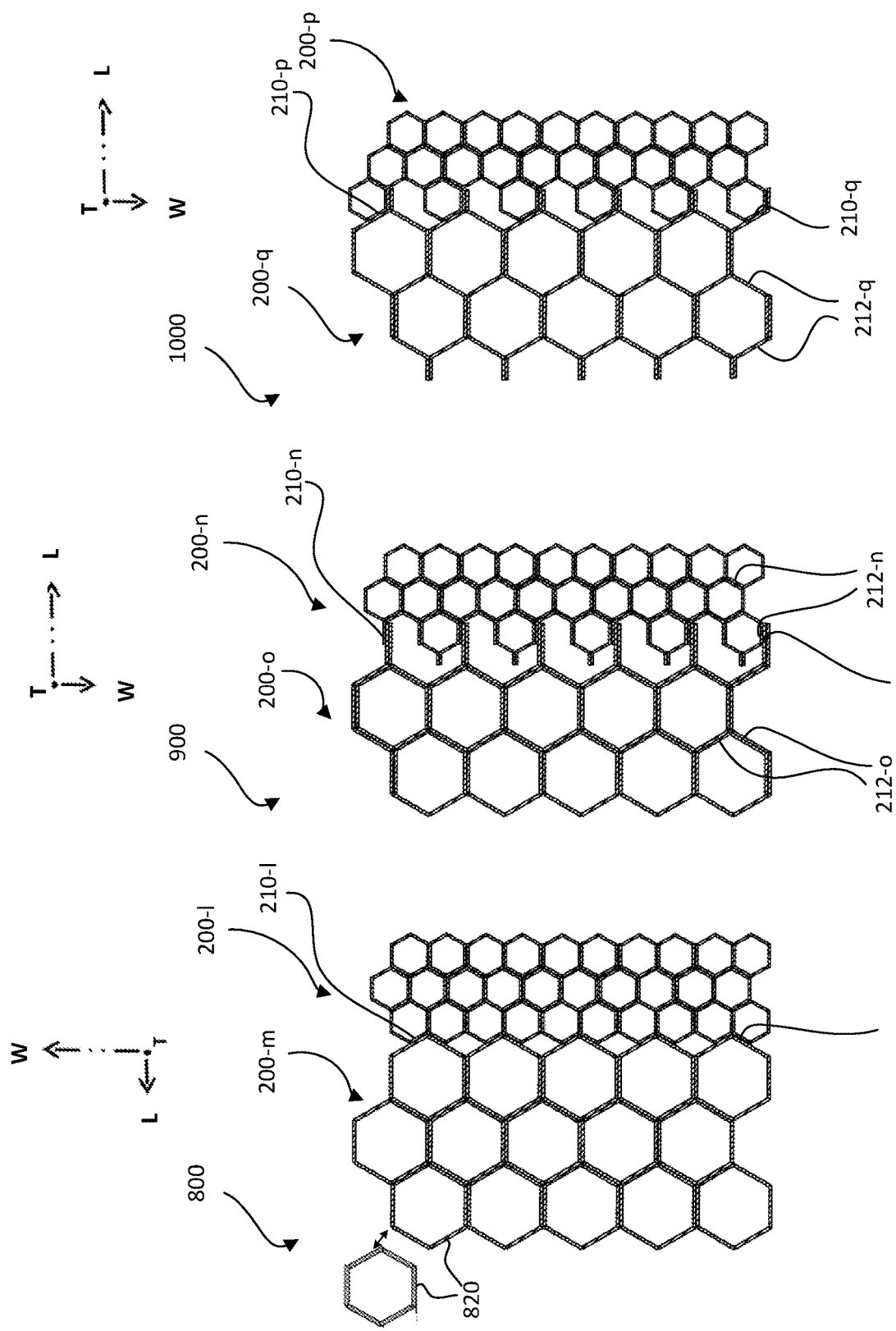

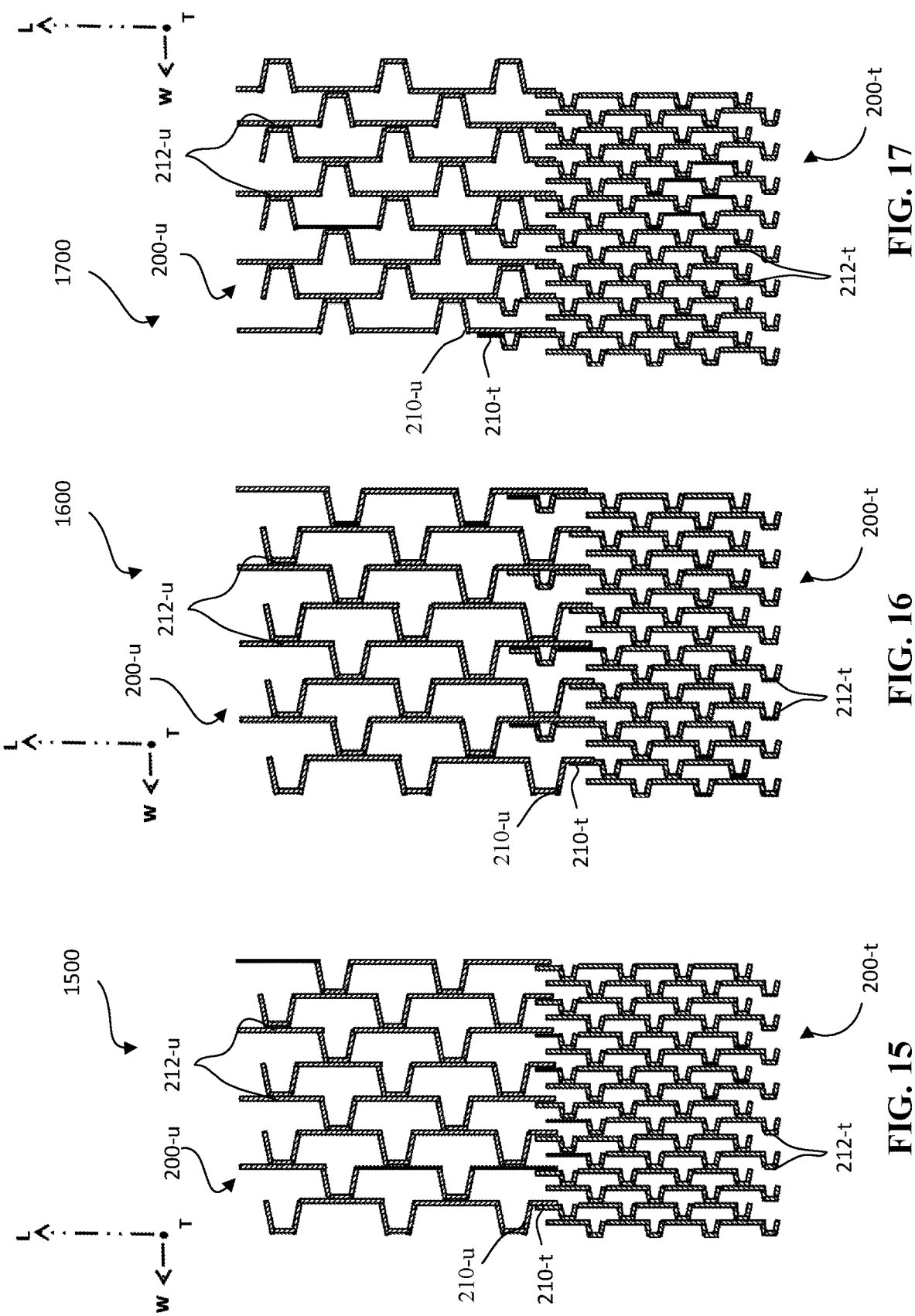

| Core | | | | | | | | | | | | | | |
|---|---|---|---|---|---|---|---|---|---|---|---|---|---|---|
| Large Core Type | Hex | Hex | Hex | Hex | Hex | Hex | Hex | Hex | Hat | Hat | Hat | Hat | Hat | Hat |
| Small Core Type | Ribbon | Either⁴ | Ribbon | Either | Winding | Either | Either | Ribbon | Ribbon | Ribbon | Ribbon | Ribbon | Ribbon | Ribbon |
| | Winding | Winding | Either | Either | Winding⁴ | Ribbon | Winding | Ribbon | Ribbon | Ribbon | Ribbon | Ribbon | Ribbon | Ribbon |
| Edge | Irregular | Irregular | Castellated | Straight | Zig-Zag | Irregular | Castellated | Straight | Irregular | Irregular | Regular | Straight | Castellated | Irregular |
| Joining | Adhesive | Either⁵ | Cocure⁵ | Either⁵ | Either⁵ | Adhesive | Adhesive | Either⁵ | Either⁵ | Adhesive | Adhesive | Adhesive | Adhesive | Adhesive |
| Fixed Small Cell Proportion² | Yes | Yes | Yes | No | Yes | Yes | Yes | Yes | Yes | Yes | Yes | Yes | Yes | Yes |
| Location Tolerance | | | | | | | | | | | | | | |
| L Direction | Yes | Contact | Contact | Large | Contact | Yes | Contact | Yes | Yes | Yes | Yes | Yes | Yes | Yes |
| W Direction | Contact | Contact | Contact | Contact | Contact | Contact | Contact | Contact | Contact | Contact | Contact | Contact | Contact | Contact |
| Bond Area (%) | 50 | 183 | 200 | 100 | 200 | 100 | 200 | 80 | 100 | 80 | 80 | 80 | 160 | 120 |
| Gas Permeability³ (%) | 10 to 50 | 200⁶ | 50⁷ | 100⁸ | 100 | 100⁸ | 10 to 50⁹ | 120 | 100 | 33¹⁰ | 33¹⁰ | 120 | 120 | 120 |
| Joint Stabilized¹¹ | No | No | No | Yes | No | No | No | No | No | No | No | No | No | No |
| Other | Need Close out ribbon (For Candy Stripe) Cell C-Lines aligned | | | | | | | | | | | | | |

** Assuming large and small cell cores are constructed from a single ply of fabric prepreg 0.0072", density is proportional to cell size, (2 pcf for 1" cell; 1 pcf for 2" cell & so on.)

1. The L and W splice types are combined to characterize a localized region / zone.
2. The proportion of small large cell is nominally in multiples of 1/2, however varying when taking into account the thickness of cell wall
3. At the splice as compared with single ply of Ribbon based fabric. (Large Cells are 100% more permeable than small ones.)
4. If odd shapes are wound, no edge ribbon is needed and all walls are +/- for candy stripe
5. For cocuring, a special set of joint mandrels would be needed
6. Assumimg both large and small cells wound with odd shapes and no edge ribbons
7. Assuming Ribbon to Ribbon / cocured
8. Assuming Ribbon to Ribbon / adhesive joint with adhesive applied only to interface facets of core blocks and not to whole surface of septum
9. Assumimg winding to winding with an edge band ribbon on small cell core
10. Localized through dense region. The flow would be normal in larger cells surrounding densified region.
11. A stabilized joint prevents a poisson relationship where a compression in one direction results in an expansion in the transverse direction in the core.

FIG. 18

NET EDGE COMPOSITE CORE SPLICES FOR AIRCRAFT WING

TECHNICAL FIELD

The present disclosure relates generally to composite core structures, and more particularly to composite core structures for use in aerospace applications.

BACKGROUND

Composite core material provides a lighter weight and a higher specific strength alternative to solid fillers and core made of impregnated paper or other non-composite materials, particularly in aerospace applications. Composite core structures made from similar composite pre-preg materials as the skins eliminate core failure modes caused by ingression of moisture and resulting degradation of core strength. Traditional core is fabricated from aluminum or Aramid paper (known as Nomex® or Korex®) honeycomb and is subject to corrosion and material breakdown if exposed to moisture. The use of composite core material eliminates the need for extra sealing of thin skins and the need to use extra layers of adhesive to bond the core to the skins and seal pinholes in the face sheets. However, the use of composite core material may pose challenges related to connection of core materials of different core cell sizes or shapes. One conventional method of joining one volume of core with another volume of core is to use a filler material to bridge the gap between the volumes and allow the separate volumes of core to transfer load between them and deflect as a single volume. An example of such a method of integrating one core volume with another core volume is to splice the gap between the edge of one of core volume and the edge of another core volume with expanding adhesive or structural fillers. The density of filler required to occupy the volume between the core blocks is higher than the effective density of the core volume and can be weight prohibitive as the splice volume is integrated along the total length of core block interfaces. In one conventional method of densifying composite core, a core with a higher strength or density is spliced into a volume of lighter core, and the spliced volume is filled with a denser filler material. In some applications, the filler is used directly in the core cells in the volume where additional strength is needed at a load application point or fastener insert location. The gas permeability of the core volume is adversely affected by the use of splice fillers and will prohibit the proper venting of the cells to allow any moisture ingression to migrate and vent through the cell walls. The cell size of core made from composite prepreg is larger than traditional core made from impregnated paper. The core can be produced in such a manner that individual cells in composite core can be located to interface with other core cells or surrounding structural elements. The application of traditional core treats the core as a smeared volume. In applications using composite core, each cell can be considered a discrete structural element. The use of composite core where the individual core cells interface with surrounding core or other structural elements is referred to as net edge composite core. In some embodiments, the cell size for composite core may range from about ⅛ inch to about 1 inch. In other embodiments the cell size may range from about ⅝ inch to about 2 inches. And in still other embodiments the cell size can be even larger. There is a need for an improved method of and related structures for splicing net edge composite core to transition from one core cell size or shape to another core cell size or shape.

DISCLOSURE OF THE INVENTION

One aspect of the present disclosure relates to a method and related structures to transition from a larger to a smaller cell core (i.e., transition between two core densities). In particular, the present disclosure relates to splicing net edge composite core where the shape of the cell is controlled sufficiently with tooling. The density of the core may vary with cell size if the wall thickness of the cells is constant. It may be desirable to make composite core with a single ply of a particular pre-preg material. If the cell size is increased, the density drops and the overall weight of the assembly decreases. This result may be desirable to tailor a design especially for cantilevered designs such as aircraft wings and stabilizer or canard structures where the loading decreases with the span of the member. The methods and related structures to splice two sizes of cores in a manner to directly interface the facets of the cells and avoid the common practice of using fillers, casting materials, and expanding adhesives is useful to optimize the specific strength of the design and minimize the weight while maximizing the load carrying capability of the structure. It may also be useful in this scenario to maintain and control the gas permeability of the core across the splice region and allow vapor from water, or other gasses to permeate across the transition boundary. This outcome may not be possible using the structural fillers, casting materials and expanding adhesives.

Another aspect of the present disclosure relates to a composite core assembly that includes first and second composite core structures. The first composite core structure has a first plurality of cells, a first cell size, and at least one first side surface defined by the first plurality of cells. The second composite core structure has a second plurality of cells, a second cell size that is greater than the first cell size, and at least one second side surface defined by the second plurality of cells. At least some of the second plurality of cells are positioned on the at least one second side surface. At least some of the first plurality of cells on the at least one first side surface aligns with and connect to at least some of the second plurality of cells on the at least one second side surface to splice the first and second composite core structures together.

The first and second composite core structures may be connected with an adhesive bond. The first and second composite core structures may be connected during curing of the first and second composite core structures. The first and second composite core structures may be connected while mandrels are positioned in at least some of the first and second plurality of cells. The second cell size may be at least two times greater than the first cell size. The first plurality of cells and the second plurality of cells may have a hexagonal cross-sectional shape or a polygonal cross-sectional shape. The first plurality of cells may be formed by one of wrapping, winding and braiding composite material around a plurality of mandrels. The second plurality of cells may be formed by wrapping composite material around a plurality of mandrels or formed from a plurality of ribbon corrugations of pre-shaped composite material. At least one of the first and second plurality of cells may be formed from a plurality of ribbon corrugations having hat-shaped or hexagonal structures formed therein. The composite core assembly may also include a planar surface interposed between and connected to the at least one first side surface and the at least one second side surface. At least some of the first plurality of cells may have a different cross-sectional shape than other of the first plurality of cells to provide improved surface contact between the first and second core structures. At least some of the second plurality of cells may have a different cross-sectional shape than other of the second plurality of cells to provide improved surface contact between the first and second core structures.

A further aspect of the present disclosure relates to a method of assembling a core structure assembly. This includes providing a first composite core structures having a first plurality of cells and a first cell size, and a second composite core structure having a second plurality of cells and a second cell size, the second cell size being greater than the first cell size, arranging facets of some of the first plurality of cells in alignment with facets of some of the second plurality of cells to create facet interfaces that maximize surface contact between the first and second composite core structures, and connecting the first and second composite core structures together at the facet interfaces.

The step of connecting the first and second composite core structures together may include bonding with an adhesive. Connecting the first and second composite core structures together may include creating a connection during cross-linking of polymer materials when curing the first and second composite core structures. Forming the first and second composite core structures may include wrapping separate mandrels with composite materials and positioning the wrapped mandrels in contact with each other. At least one of the first and second composite core structures may be formed by connecting together a plurality of ribbon corrugations of composite material. The method may further include preparing the facets for bonding by removing mold release chemicals from the facet. The method may also include arranging facets of at least some of the first plurality of cells in alignment with facets of at least some of the second plurality of cells to create facet interfaces that provide surface contact and allow gas permeability between the first and second composite core structures.

Another aspect of the present disclosure relates to an apparatus with an internal composite core. The apparatus includes a housing having an internal cavity with a length, width and height, a first composite core structure having a first cell size for use in the cavity, and a second composite core structure having a second cell size that is greater than the first cell size. The first and second composite core structures are connected together at an interface between cells of the first and second composite core structures.

One of the first and second composite core structures may be formed from a plurality of interconnected ribbons of composite material, the ribbons being arranged in a length direction of the housing or in a width direction of the housing. Cells of at least one of the first and second composite core structure may be formed from a plurality of mandrels wrapped, wound or braided with composite material and arranged in contact with each other. Cells of at least one of the first and second composite core structure may have a hexagonal cross-sectional shape. Cells of at least one of the first and second composite core structure may include a hat-shaped portion.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

FIGS. 4-17 are top views of example composite core structures spliced together in accordance with the present disclosure;

FIG. 18 is a chart showing properties of the composite core structures shown in FIGS. 4-17.

Figure 1:
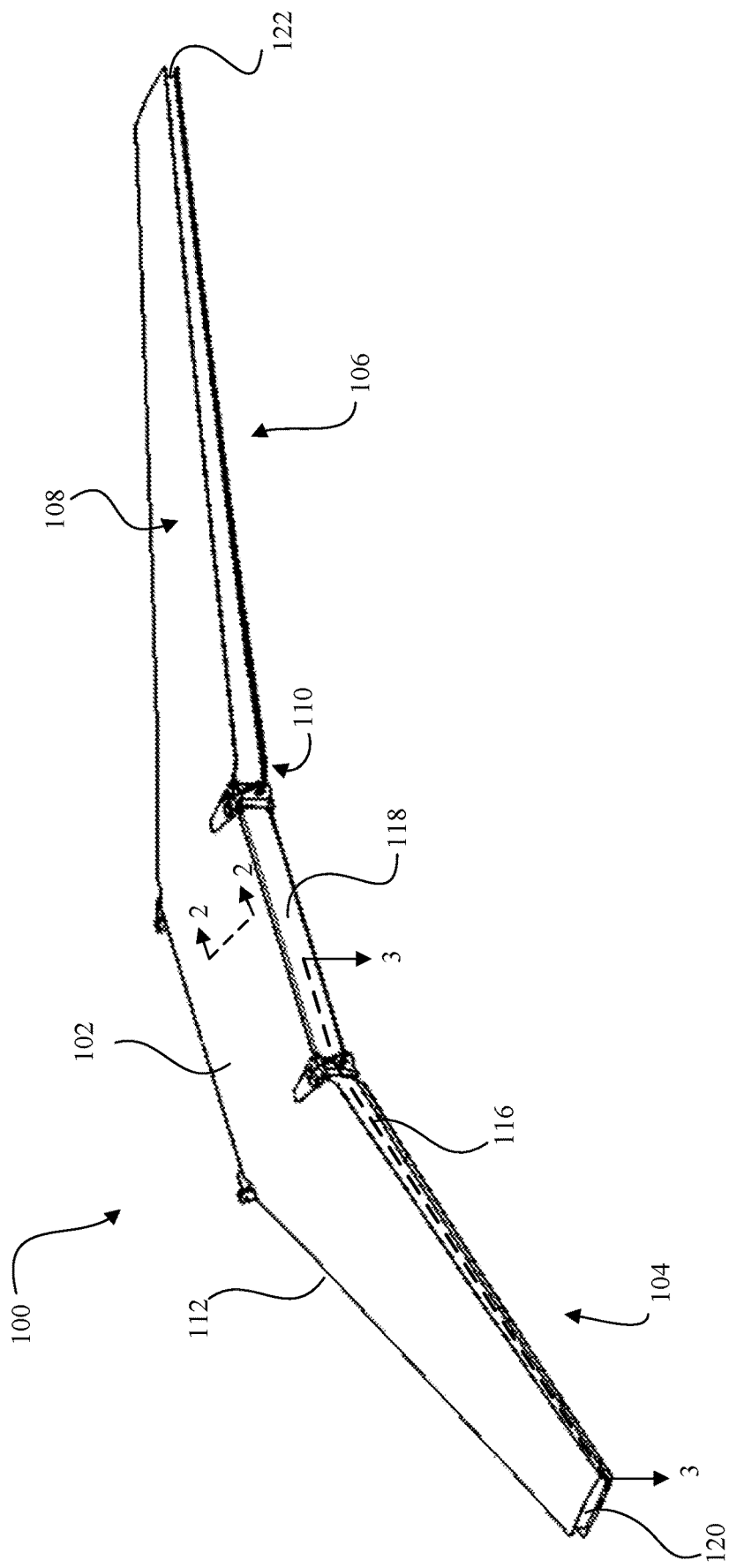
FIG. 1 is a perspective view of an exemplary wing box structure in accordance with the present disclosure.

While the embodiments described herein are susceptible to various modifications and alternative forms, specific embodiments have been shown by way of example in the drawings and will be described in detail herein. However, the exemplary embodiments described herein are not intended to be limited to the forms disclosed. Rather, the instant disclosure covers all modifications, equivalents, and alternatives falling within the scope of the appended claims.

BEST MODE(S) FOR CARRYING OUT THE INVENTION

Some aerospace applications use composite core technology to add stability and strength to various portions of the aircraft without adding a significant amount of weight or provide similar stability and/or strength as other materials and/or structures at a reduced amount of weight. The present disclosure represents one of a set of structural details enabling the use of Net Edge Composite Core (NECC) in applications where the loading diminishes with span and where concentrated loads are introduced at discrete locations throughout the volume of the core and on the surrounding structural enclosure of the core volume. The present disclosure allows the densification of NECC in certain regions of the volume and transitions to adjacent regions of less dense core. The present disclosure also describes a family of different embodiments matching the particular splice detail with desired properties and without using traditional fillers, expanding adhesives, and casting materials that add excessive weight and prevent migration of fluid vapor and venting of the core. For example, when reduced resistance is needed from fluid vapor migration between zones, a particular splice configuration can be used.

An example method and related apparatus are directed to transitioning from one type of core to irregular edge of an internal block of core to another block of core with dissimilar sized cells without using structural fillers, foams, or casting compounds. The method also includes using the existing facets of the core cells, whether they be honeycomb or a flex ribbon-based configuration, to interface with the boundary faces of the other core cells to provide structural continuity in a weight efficient way.

The process of incorporating the core transition directly into the fabrication steps of the whole volume of core is another aspect of the present disclosure, wherein one sized core cell is cured with a given sized core cell, and cross linking is accomplished between one sized cell and another. Such splicing together of different core structures may involve the use of custom or modified tooling mandrels to allow the transition to be integrated into the basic fabrication of the core block.

The methods and apparatuses of the present disclosure may be useful in both military and commercial aerospace wings, torque box structures, and control surfaces, including flaperons, ailerons, and leading edge and leading edge slat structures. The present disclosure may also be useful in horizontal and vertical stabilizers, canards, elevators, and rudders as well as skins and internal structure, including longerons, ribs, intercostals, and in-door and access panel structures. The present disclosure may also be used in rocket bodies, cones, radomes, fins and rotor blades, and the like. The present disclosure may also be useful with other types of structures including, for example, marine, submarine, space, land vehicles, buses, trains, trucks and transit vehicles.

FIG. 1 illustrates an example of a potential structure which may utilize the embodiments described herein. The potential structure pictured is a wing torque box 100. Other examples of structure include, but are not limited to, wind turbine blades, rotor blades, wing structures, and other structures which benefit from low weight applications. Some of these applications are outside of the aerospace field. The wing torque box 100 may include a center box section 102, a left-wing section 104, and a right-wing section 106. The wing torque box 100 may be bound by an upper skin 108 and a lower skin 110 opposing the upper skin 108. A forward end 112 of the wing torque box 100 is bound by a forward spar (not shown) and an aft end 116 of the wing torque box 100 is bound by an aft spar 118. The forward spar may be arranged opposite the aft spar 118. The wing torque box 100 may also include first and second side ribs 120, 122 arranged at opposite ends of the wing torque box 100.

The upper and lower skins 108, 110 are supported by an internal structure which may provide structural integrity. For example, the wing torque box 100 may bend without the skins 108, 110 buckling. This may prevent the wing torque box 100 from collapsing and may also limit aerodynamic or flight safety issues that might otherwise occur. In some embodiments, the skins 108, 110 may be stiffened with longitudinal elements. In some other embodiments, the internal stiffening supports may include core material comprising composite core structure.

Figure 2:
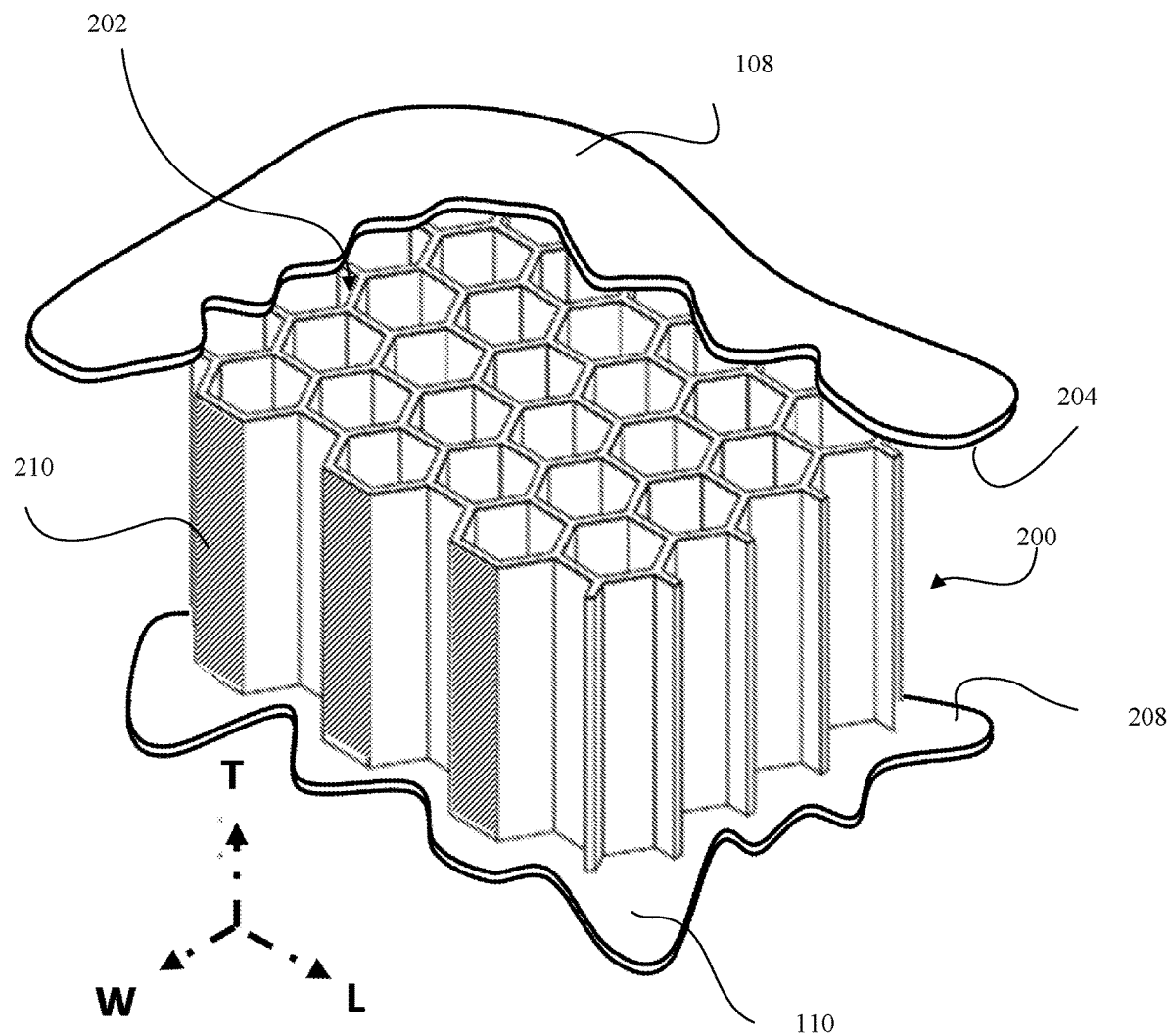
FIG. 2 is a perspective cut-away view of an exemplary section of the wing box structure of FIG. 1 taken along lines 2-2.

For example, FIG. 2 illustrates a perspective cut-away view of the wing torque box 100 of FIG. 1 along lines 2-2. The interior of the wing torque box 100 may comprise a composite core structure 200 between the upper and low skins 108, 110. The core structure 200 is typically made from plies of continuous fiber reinforced material. The core structure 200 may be have an upper surface 202 contoured to match an interior surface 204 of the upper skin 108. In some embodiments, the core structure 200 may have a bottom surface (not shown but arranged opposite the upper surface 202) to match an interior surface 208 of the lower skin 110. In some embodiments the lower skin 110 can also be described as an inner skin 110 and the upper skin 108 can also be described as an outer skin 108. The inner skin 110 may be detailed such that the distance between the inner and outer skins 110, 108 may be a constant. The contouring may be dependent on the support structure. For example, the contouring may differ between a wing box structure and a wind turbine blade.

The core structure 200 may comprise a ribbon corrugation. The ribbon corrugation, as will be discussed later, may have a ribbon direction. In the embodiment shown, the ribbon direction may align with a length L of the core structure 200. The width W of the core structure 200 may be determined based at least in part on the number of ribbons attached together. An overall thickness T of the core structure 200 may vary along the width W and length L of the core structure 200. For example, if the upper skin 108, and in some embodiments, lower skin 110, vary in contour along an outer surface of the surrounding structure, the thickness T of the core structure 200 may vary as well. In other embodiments, if the upper skin 108 and/or lower skin 110 are substantially planar with a constant distance between them, then the thickness T of the core structure 200 may be consistent.

The core structure 200 may be a composite core structure. In the embodiment show, the core structure may be comprised of a plurality of cells having hexagonal cross-sectional shapes. The cells may have a size, for example, of about ¼ inch to ¾ inch wide. In some embodiments, the hexagonal cell-shape may be larger than about 3 inches wide or smaller than about ¼ inch wide. In some embodiments, the cell size of one core structure is a multiple of the cell size of the other core structure. For example, one core size may be 1 inch, and the other core size may be ½ inch, ¼ inch, ⅛ inch, or 1/16 inch. In other embodiments, the core cell sizes are different, but within a close range of each other, such as one cell size being within ⅛ inch or 1/16 inch or 1/32 inch of the other cell size. In other embodiments, the core cell sizes are different, but within a percentage size of each other, such as one cell size being within 50% to about 95% of the other cell size.

The core structure 200 may further include a net edge core. Net edge core may be manufactured such that the location of individual cells is planned for in the final assembly. For example, the distances between end facets 210 of individual cells may be predetermined such that an end facet 210 may mate with an edge of the surrounding structure or an adjacent composite core structure, and an opposing edge facet (not shown) of the core structure 200 may mate with the opposing edge of the surrounding structure or a different composite core structure.

Figure 3:
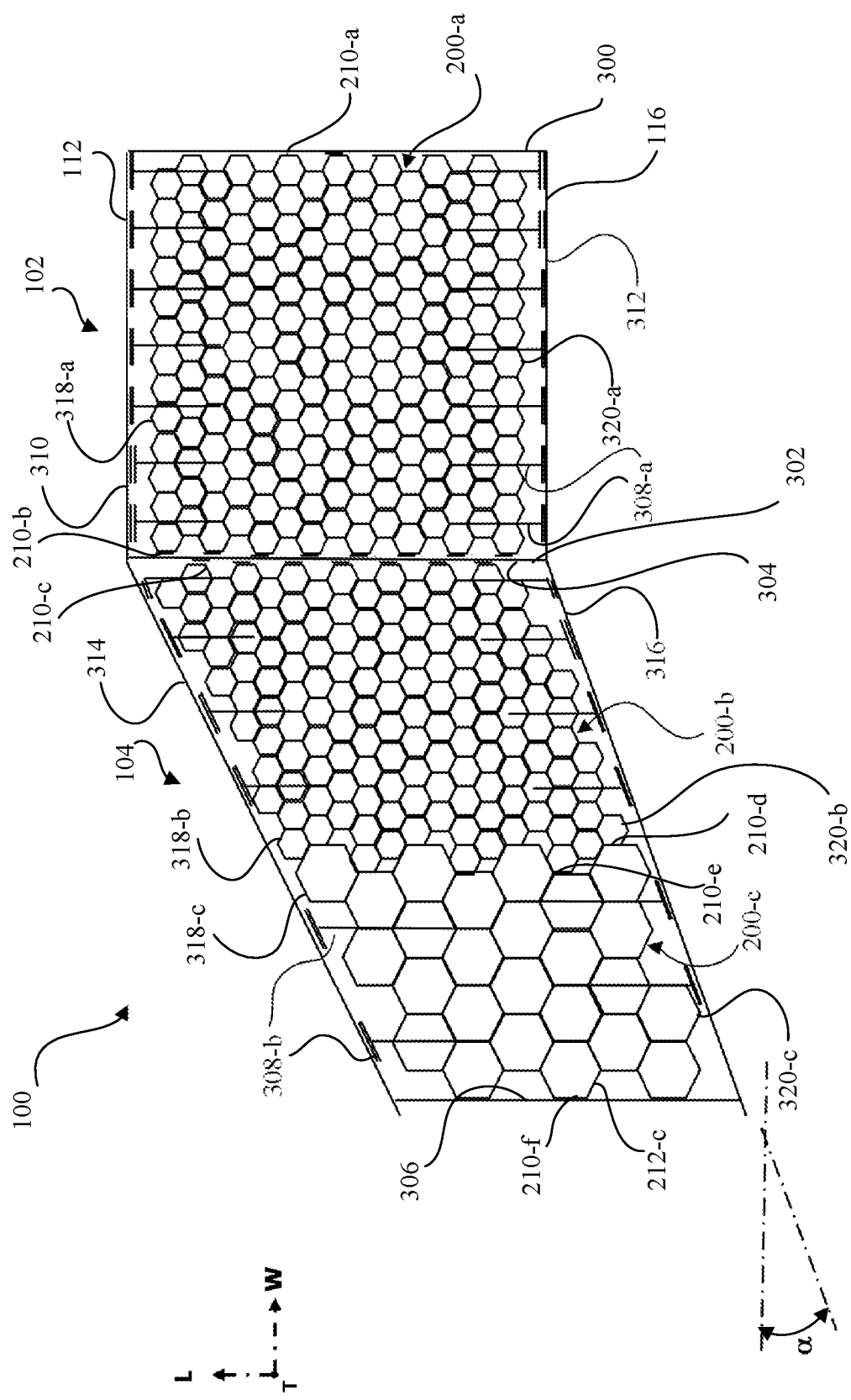
FIG. 3 is a top perspective view of a cross-section of the wing box structure shown in FIG. 1 taken along lines 3-3.

For example, as shown in FIG. 3, end facets 210-a of a first core structure 200-a mate against an internal surface 300 of the torque box 100, and end facets 210-b of the first core structure 200-a mate against a surface 302 of the toque box 100. The torque box 100 in this example is merely exemplary as the core structure 200 may be used in a variety of applications as discussed previously. In the left-wing section 104 of the torque box 100, end facets 210-c of a second core structure 200-b mate with an internal surface 304 of the left-wing section 104, and end facets 210-d of the second core structure 200-b mate with end facets 210-e of a third core structure 200-c. An opposing end facet 210-f of the third core structure 200-c mate with an end surface 306 of the left-wing section 104. The right-wing section (e.g., right-wing section 106 in FIG. 1) may have a similar structure and arrangement of facets for a plurality of core structures 200.

At the forward end 112 and aft end 116 of the wing torque box 100, the core structures 200 may not have any flat surfaces (e.g., end facets) to mate with surrounding walls of the torque box 100 along the length L of the core structures 200 (e.g., referred to as surrounding support structure). Therefore, in some embodiments, one or more rails 308 may attach the core structures 200 to the wing torque box 100. The rails 308 may enable the core structure 200-s to provide strength and rigidity while reducing weight as compared to other attachment means. The rails 308 may be integrated into the core structures 200 during fabrication of the core structures 200 or may be inserted afterwards.

The rails 308 also enable the core structures 200 to attach to non-uniform surfaces. For example, in the center box section 102, the forward and aft walls 310, 312 are substantially perpendicular to the surface 300. Not all mating surfaces in all applications will be perpendicular. For example, the forward and aft walls 314, 316 of the left-wing section 104 are not perpendicular to the end surfaces 300, 306. Rather, the swept portion of the wing torque box 100 is offset at an angle α from the aft wall 312. The rails 308 may connect the core structure 200 to these offset walls 314, 316.

Rails 308 can also be used to attach the core structures 200 to surrounding surfaces that may be perpendicular to the length L of the core structures 200, provided the ribbon direction is aligned with the length L. The core edges 318-*a*, 318-*b*, 318-*c* and 320-*a*, 320-*b*, 320-*c* have insufficient bonding area to communicate forces from the core structure 200 to the surrounding walls 310, 312. The rails 308 may bridge between the core edges 318, 320 and the forward and aft walls 310, 312.

The core structures 200 described herein may be designed with specific cell sizes, shapes and orientations to provide improved surface contact between adjacent positioned core structures. The improved surface contact may result in a number of advantages as compared to other types of composite core splicing techniques and structures. The embodiments illustrated in FIGS. 4-17 are exemplary of various combinations of core structures that are possible, and should not be considered limiting to the many combinations of features possible in accordance with the principles of the present disclosure.

FIG. 4 illustrates an embodiment 400 that includes a core transition splice between core structures 200-*d* and 200-*e*. The core structure 200-*d* has a greater cell density than the core structure 200-*e*. In at least one embodiment, the ratio of core density is about 2:1 for a constant wall thickness. Each of the core structures 200-*d*, 200-*e* comprises cells having a hexagonal shape. The individual cells of the core structure 200-*d* may be formed by wrapping or winding composite material around the hexagonal mandrels 402-*a* and then assembling the mandrels in a desired pattern. The assembled mandrels can then be constrained from thermal expansion and cured (e.g., in an oven cycle) to form the composite core structure 200-*d*. The composite materials may be constrained on the mandrels 402-*a* during curing cycle (e.g., an oven cycle) to cure the composite materials and form a composite core structure 200-*d*. The curing process may cause the resin in the composite to cross-link during the cocure, or otherwise adhere the separate polygons together. One method to produce core 200-*d* is to use a candy stripe or spiral wrap method to place material on the mandrel. U.S. Pat. No. 9,120,255 discloses additional details regarding fabricating a spiral wrapped core, and is incorporated herein in its entirety by this reference. The candy stripe method works when each mandrel is wrapped in the same spiral orientation and when mandrels are placed adjacent to each other to cure the core 200-*d* such that the double walls of the two interfacing cells complete a +/−45 wall. The open edge of the core structure 200-*d* is typically closed out with a separate edge ply where no adjacent cell is present. The separate edge ply can be a unidirectional ply placed to complete a +/−45 degree wall where no adjacent cell is present.

In another embodiment, the polygon cells may be formed and cured separately and then adhered or otherwise joined together to form the core structure 200-*d*. For this embodiment, adhering separate cells together may adversely affect density of resulting core and therefore is less preferred in some designs. Joining separate cells together with adhesive also inhibits gases from passing between the cell walls. This gas permeability may otherwise allow moisture to escape from the core.

The core structure 200-*e* may consistent of separate ribbon corrugations 212-*e*. The core structure 200-*e* may be constructed by placing the separate ribbon corrugations 212-*e* over mandrels 402-*b* (e.g., hexagonal-shaped mandrels) or other components. Typically, the mandrels may be symmetric. The separate ribbon corrugations 212-*e* may also be symmetric. The ribbon corrugations 212-*e* may be arranged in the L direction. The composite materials may be constrained on the mandrels 402-*b* during curing cycle (e.g., an oven cycle) to cure the composite materials and form a composite core structure 200-*e*. For example, the composite material may consist of any available pre-preg material including, for example, epoxies, cyanate ester, polyimides or vinyl esters, and phenolic resin, with glass, carbon, quartz, and/or fibers. Generally, if the material can be pre-pregged, the core can be produced. The curing cycle may consist, for example, of placing the ribbon corrugation on mandrel tooling in an oven to cure the material. Curing material may consist of hardening the material to form a rigid, interconnected set of structural ribbons forming interconnected cells. The curing cycle may include a thermosetting chemical reaction resulting in the creation of polymer chains and cross-linking across ply boundaries. The mandrels may be extracted after the composite material is consolidated and cured.

The interconnected cells can be cured as separate core blocks and then adhesively bonded together in a subsequent bonding cycle to cure the adhesive. Only light pressure may be required at the adhesive interface to facilitate the bond cure cycle. One method of getting this localized bond pressure is to reinsert the mandrels along the bond interface and restrain them such that bond interfaces press against each other.

If the core structures 200-*d*, 200-*e* are fabricated by adhesively bonding the hexagonal shaped cells together, the attachment surfaces may be prepared for bonding and adhesive placed between the cells and/or between the core structures 200-*d*, 200-*e*, for example, after the core structures 200-*d*, 200-*e* are cured. In some embodiments, the preparation may include media blasting the surface, for example, the end facets 210-*d*, 210-*e*, by removing any residual mold release or other contaminants or applying one or more solvents to the end facets 210 to better accept adhesive and bond to the core structure. Still further methods include preparing the surface for bonding (for both block to block and block to skin) include ultrasonically cleaning the core blocks and plasma treating them to remove any residual mold release agents or other contaminants. The single ply core skins are typically too fragile to media blast or peel. Some preparation methods mentioned above are applicable to outer and inner skin surfaces only. Other preparation methods may include grit blasting, peel ply, and the like.

Generally, the embodiment 400 may be described as a hexagonal composite core splice with generic ribbon in the L direction for the core structure 200-*e* spliced to wrapped core structure 200-*d*. The centerline $C_L$ of individual hexagonal cells at the core structures 200-*d*, 200-*e* are aligned as shown in FIG. 4. With the density ratio of 2:1, the arrangement of embodiment 400 provides a one-to-one correspondence between the end facets 210-*d*, 210-*e*. In other words, a single hexagon surface from each cell of the core structure 200-*d* mates with a single hexagonal surface for each cell of the core structure 200-*e*. For the given density ratio (2:1) and shape (hexagonal) for the cells of the core structures 200-*d*, 200-*e*, the embodiment 400 provides a minimal, but effective surface contact between the core structures to provide the desired splicing outcome. FIG. 18 provides a summary of properties and details related to the embodiment of FIG. 4.

FIG. 5 illustrates an embodiment 500 with core structures 200-*f*, 200-*g*. The separate core structures 200-*f*, 200-*g* may have similar cell densities and be formed in a similar way as compared to the core structures 200-*d*, 200-*e* of embodiment 400. For example, core structure 200-*g* may include a plurality of ribbon corrugations 212-*g* that are formed together to form a plurality of hexagonal cells. The cells of core structure 200-*g* may also be wrapped or wound or fabricated as ribbons as described in FIG. 4 above. The cells of core structure 200-*f* may be formed by wrapping composite material around individual mandrels as described above with reference to embodiment 400. The spiral winding method may produce a core with comparable wall thickness as the single pre-preg fabric layer typically used for the ribbon-based core. The ribbon based core, however, has double thickness at all the ribbon interfaces. The spiral wrapped core eliminates these double thickness interfaces and is therefore lighter overall. Wrapping with fabric effectively doubles the wall thickness for all core cell facets unless a thinner fabric is used.

The centerline $C_L$ for the cells of core structure 200-*f* may be offset in the L direction relative to the centerline's $C_L$ of the core structure 200-*g*. Consequently, more of the end facets 210-*f* of the core structure 200-*f* interface with the end facets 210-*g* of the core structure 200-*g*. The amount of surface interface of the end facets in embodiment 500 is about twice as great as the amount of surface contact between the end facets of embodiment 400.

The embodiment 500 may be referred to as hexagonal in the L direction with a ribbon core structure connected to a wrap core structure. The edge of the core structures 200-*f*, 200-*g* are irregular. FIG. 18 provides a summary of properties and details related to the embodiment of FIG. 5. Further, the core 200-*f* may self-align with core 200-*g* because of the wedging of the +/−30 degree facets.

FIG. 6 illustrates another embodiment 600 that includes core structures 200-*h*, 200-*i* spliced together. In this embodiment, both core structures 200-*h*, 200-*i* may be formed from a plurality of ribbon corrugations 212-*h*, 212-*i* that are connected to form the hexagonal shaped cells of each core structure. Generally, the embodiment 600 may be described as hexagonal core structures with ribbon corrugations in the L direction with a ribbon to ribbon splice arrangement. The core structures 200-*h*, 200-*i* may be cured simultaneously with the curing of the ribbon corrugations 212-*h*, 212-*i* and the ribbon corrugations wrap around mandrels to form the plurality of hexagonal cells for each of the core structures 200-*h*, 200-*i*. This may enable cross-linking in the resin to occur and a plurality of interconnected joints to be formed.

Further, the centerline $C_L$ of both core structures 200-*h*, 200-*i* may be aligned. However, to provide further surface interface between the end facets 210-*h*, 210-*i*, either the ribbon corrugation 212-*i* that forms the end facets 210-*i* has a modified shape, and/or the mandrels used to form the cells that provide the end facets 210-*i* is modified. FIG. 6 illustrates a modified ribbon 214-*i* that created additional end facets 210-*i*, thereby providing increased surface contact between the core structures 200-*h*, 200-*i*. The shear strength of this interface may be the highest of the embodiments disclosed herein because the bond surface area is approximately double or more than that of other disclosed embodiments. The gas permeability is affected, however, and may be much lower (e.g., only about half) of the adjacent small celled core assuming both large and small cells are ribbon based. Many other modified ribbon designs and/or cell shapes may be used to provide different amounts of surface contact area between spliced core structures. The table and associated descriptions shown in FIG. 18 provide a summary of properties and details related to the embodiment of FIG. 6.

In some embodiments, the interfaces (e.g., end facets 210-*i*, 210-*h*) between the core structures 200-*i*, 200-*h* are cured simultaneously with the curing of the ribbon corrugations 212-*i*. The composite may wrap around a plurality of mandrels 402-*c* to form the plurality of hexagonal cells for each of the core structures 200-*i*, 200-*h*. This may enable cross-linking in the resin to occur and a plurality of interconnected joints to be formed. In other embodiments, the ribbon corrugations 212-*e* and separate hexagonal cells associated with each of the mandrels 402-*a* may be separately cured and later adhesively bonded together. For example, the cured ribbon corrugations 212-*e* shown in FIG. 4 may be bonded together using a hot film. The film may have a certain thickness and softens and cures during a cure cycle. In some embodiments, a film adhesive is useful to join core structures 200-*e* to 200-*d*. Film adhesive may be placed at an interface between the core blocks. The film can be supported with scrim for better control of bond line thickness. Light contact pressure between the interface components may be sufficient for the film to cure and adhere the interface in an oven heating cycle. The assembly is placed in an oven to cure the adhesive in place. Another embodiment involves use of a stacked pin method using ribbon corrugations in a way that substantially eliminates the need for adhesive between ribbons and allows cross-linking during co-cure, as described in U.S. Pat. No. 5,567,500, which is incorporated herein in its entirety by this reference.

FIG. 7 illustrates an embodiment 700 having core structures 200-*j*, 200-*k* that are spliced together using a septum 216 interposed between the core structures. The core structure 200-*j* includes a plurality of ribbon corrugations 212-*j* arranged in the L direction. The core structure 200-*k* includes a plurality of ribbon corrugations 212-*k* arranged in the L direction. The ribbon configuration of FIG. 7 may be the most flexible of the embodiments disclosed herein. Either the large or small cell cores can be made from a wrap technique or a ribbon technique. The planar septum 216 provides a planar connection surface or interface and is interposed between end facets 210-*j*, 210-*k* of the core structures 220-*j*, 200-*k*. Although the centerline $C_L$ of the cells of the core structures 200-*j*, 200-*k* are aligned as in the embodiment 400, the septum may provide at least the same or greater surface contact between the two core structures along the end facets 210-*j*, 210-*k*, and may provide other advantages such as increased strength, stability, or ease of manufacturing. The location of the small cells may be independent from a location of the large cells along their longitudinal direction L and across the septum.

The embodiment 700 may be referred to as a hexagonal cell configuration with ribbon corrugations arranged in the L direction and the core structures each comprise ribbon corrugations. The embodiment 700 may also be referred to as a stabilized core, whereas the other embodiments disclosed herein may generally be referred to as being unstabilize or not stabilized. When the core block of embodiment 700 is compressed in the longitudinal direction L, the core will expand in the W direction as a result. Conversely, when the core is compressed in the width direction W, the core expands in the L direction. This behavior may be useful in fitting the core in a predetermined space and allows compensation between the L and W directions, as well as generating pressure at the edge interface with the surrounding structure for adhesive bonding. The septum feature in the embodiment 700 prevents this effect. The core cannot be compressed in either direction without causing the septum to buckle. Stability is covered in row "Joint Stabilized" in FIG. 18.

FIG. 8 illustrates an embodiment 800 having similar core densities and core shapes as shown in the above embodiments. Embodiment 800 includes core structures 200-*l*, 200-*m* that are spliced together at end facets 210-*l*, 210-*m*. The splice is arranged transverse to the longitudinal direction L. The hex structures are rotated 90 degrees relative to the embodiments shown in FIGS. 4-7 to be aligned in the W direction. The core structures 200-*l*, 200-*m* may each be formed by individually wrapping a plurality of mandrels to create a plurality of separate cells (e.g., cells 820 for core structure 200-*m*). In one embodiment, all the cells can be spiral wound with a single wrap around each individual mandrel. In order for each cell interface to be balanced with both a plus and minus 45° fiber. The small odd shaped diamond mandrel may also be wrapped. Further, the individual cells may be formed by a 50% single wrap using half ply, and a 50% double wrap using a full ply. Additional details regarding formation of the core structures 200-*l*, 200-*m* using a single direction or spiral wound winding on mandrel can be found in U.S. Pat. No. 9,713,913, which is incorporated herein in its entirety by this reference. FIG. 18 provides a summary of properties and details related to the embodiment of FIG. 8.

FIG. 9 illustrates another embodiment 900 that includes core structures 200-*n*, 200-*o* that interface at end facets 210-*n*, 210-*o*. The core structure 200-*n* may be formed by a plurality of ribbon corrugations 212-*n*. The core structure 200-*o* may be formed by a plurality of ribbon corrugations 212-*o*. The hexagonal cells of both core structures 200-*n*, 200-*o* are configured in the W direction. The end facets 210-*n*, 210-*o* are configured along different surfaces of the individual cells as compared to the embodiment 800. For example, an outer surface of the cells of core structure 200-*n* interface with inner surfaces of the cells of the core structure 200-*o*.

The embodiment 900 may be referred to as a hexagonal core structure with direct splicing in the W direction. The ribbon corrugations are provided in both core structures of the embodiment and are matched with L base permeability. The core structure 200-*o* may have a gas permeability (κ) that is approximately two times that of the core structure 200-*n* because of double the number of cell walls. The embodiment 900 may provide a double walled area where 2 ribbons are joined and trimmed to the necessary length also known as a post bond-Y. The gas permeability across the splice is dependent on the area of single wall core plies facets versus double wall core facets or more. The pinholes present in a single ply allow the passage of gasses across the ply through the pin holes. When two plies are cured together or when a layer of adhesive is added, the number of pin holes is significantly reduced, thereby effectively limiting the transfer of gas across the wall. When the cell wall is wound in a single direction and an adjacent wall interfaces in the opposite direction, the resulting wall may be equivalent to a single wall of fabric and will contain a number of pin holes. When portions of the splice contain single wall passageways and double wall passageways, the area of the single wall interfaces insure that gasses can vent across the splice. FIG. 18 provides a summary of properties and details related to the embodiment of FIG. 9.

FIG. 10 illustrates an embodiment 1000 having core structures 200-*p*, 200-*q*. The core structure 200-*p* is formed from a plurality of individually wrapped mandrels and provides end facets 210-*p*. Core structure 200-*q* is formed from a plurality of ribbon corrugations 212-*q* and provide a plurality of end facets 210-*q*. The core structure 200-*q* has a slightly modified shape along the interface with core structure 200-*p* as compared to embodiments 800, 900 to provide additional surface contact between end facets 210-*p*, 210-*q*.

Embodiment 1000 may be referred to as a hexagonal construction with direct splicing between a ribbon core structure and a wrapped core structure. The hexagonal cells are arranged in the W direction. The permeability of gas through the core structures of embodiments 1000 may be the highest among the three embodiments shown in FIGS. 8-10 due to the reduced number of double wall thicknesses of the cells for both core structures 200-*p*, 200-*q*. The embodiment 1000 may have a post bond-Y with double bond areas. FIG. 18 provides a summary of properties and details related to the embodiment of FIG. 10.

Figures 11, 12:
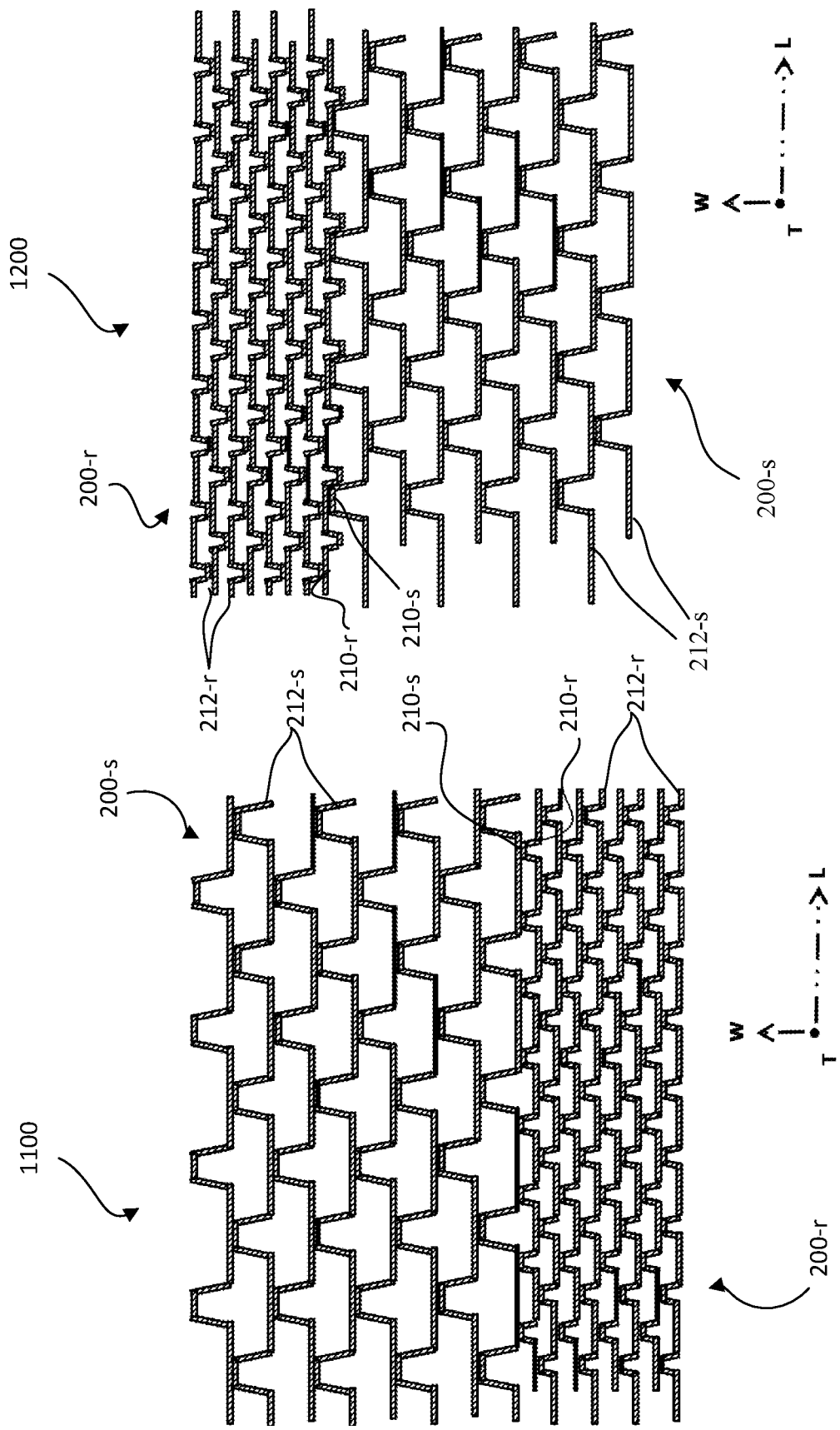

FIGS. 11 and 12 illustrate embodiments 1100, 1200, respectively that are formed from ribbon corrugations having a different cross-sectional shapes as compared to previously described embodiments. The ribbon corrugations may refer to as having hat-shaped structures. The ribbon corrugations may also be referred to as flex corrugations or flex ribbons and may be particularly useful for forming shapes that have curvature rather than the generally linear shape of the core structures shown in FIGS. 11 and 12.

Embodiment 1100 includes core structures 200-*r*, 200-*s* that include ribbon corrugations 212-*r*, 212-*s*, respectively. The core structure 200-*r* includes a plurality of end facets 210-*r*. The core structure 200-*s* includes a plurality of end facets 210-*s*. The ribbon corrugations 212-*r*, 212-*s* are arranged in the L direction. The hat-structures of every other ribbon corrugation 212-*r* is aligned with the hat-structure of every other ribbon corrugation 212-*s*. The surface contact between the end facets 210-*r*, 210-*s* is relatively limited in embodiment 1100.

Embodiment 1200 shown in FIG. 12 includes rearrangement of the higher density core structure 200-*r* compared to the higher density core structure 200-*s* as compared to embodiment 1100. The core structure 200-*r* is arranged vertically above the core structure 200-*s*, and the hat orientations of the ribbon corrugations 212-*r* are inverted upside down and facing the hat structures of the ribbon corrugations 212-*s*. Consequently, the end facets 210-*r* are provided along different surfaces of the ribbon corrugations 212-*r* and the end facets 210-*s* are provided along different surfaces of the ribbon corrugations 212-*s* as compared to embodiment 1100. The embodiment 1200 has a higher surface contact as compared to the embodiment 1100. FIG. 18 provides a summary of properties and details related to the embodiment of FIGS. 11 and 12.

Figure 14:
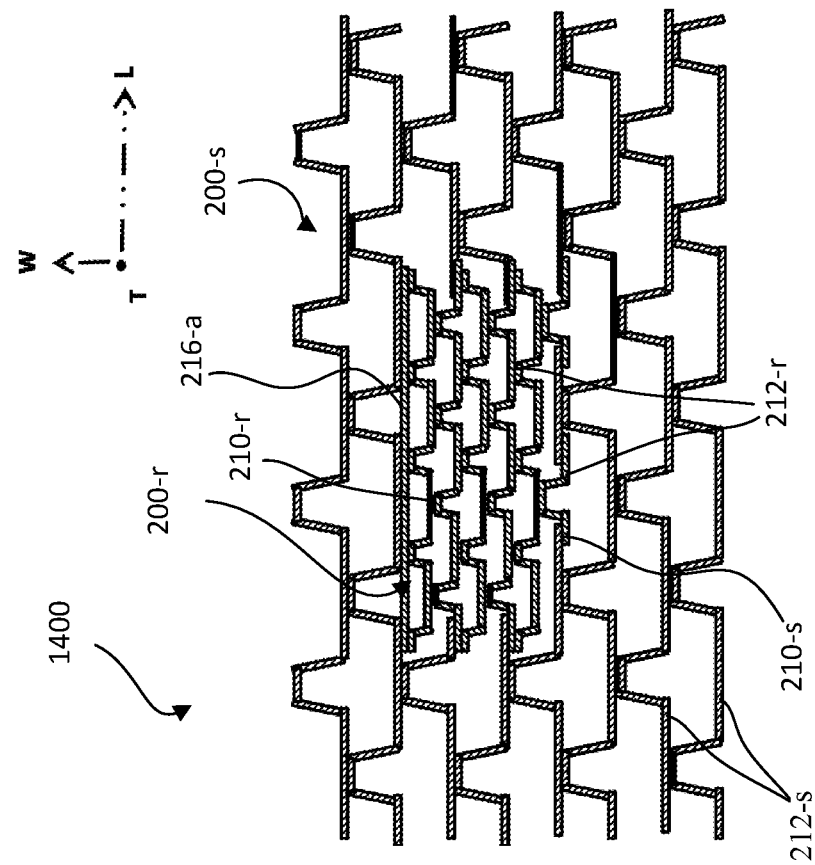
Figure 13:
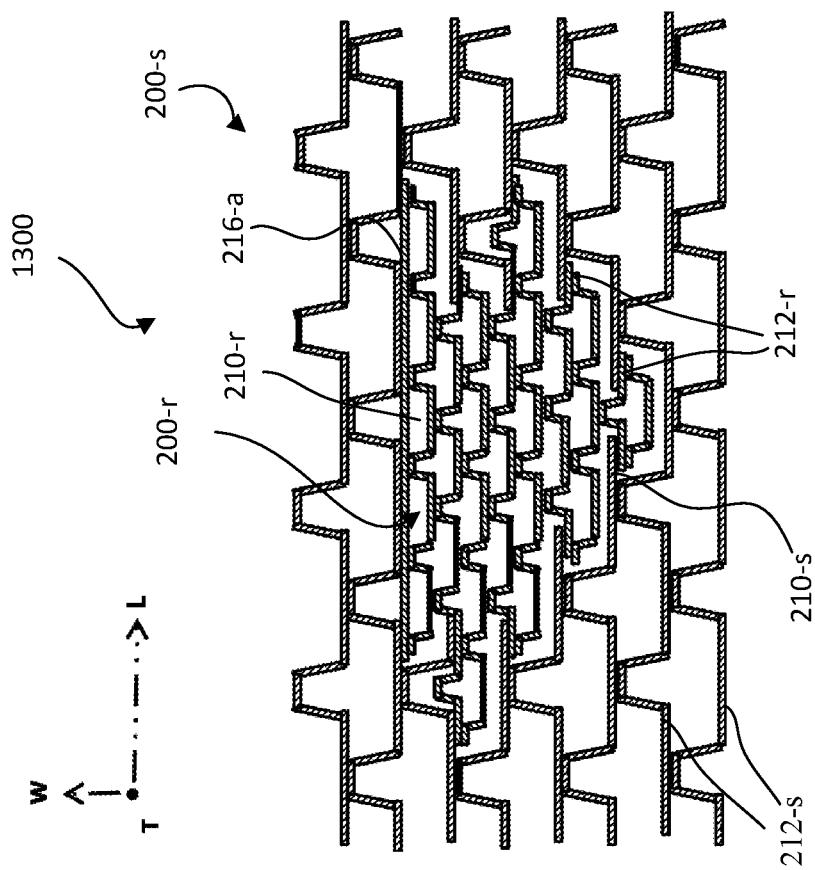

FIGS. 13 and 14 illustrate further embodiments 1300, 1400 with different orientations and arrangements for the high density core structure 200-*r* compared to the lower density core structure 200-*s*. Embodiment 1300 includes the high density core structure 200-*r* positioned internal the core structure 200-*s* with a unique arrangement of interfaces between the end facets 210-*r*, 210-*s*. Further, a septum 216-*a* is provided at an interface between some of the ribbon corrugations 212-*r*, 210-*s*.

Embodiment 1400 shown in FIG. 14 also includes the high density core structure 200-*r* integrated internal the core structure 200-*s*. A septum 216-*a* is interposed between one of the ribbon corrugations 212-*r* and 212-*s*. The facets 210-*r*, 210-*s* provide a different amount of surface contact between the core structures as compared to the embodiment 1300.

The ribbon corrugations 212-*r*, 212-*s* are arranged in the L direction. In other embodiments, one of the ribbon corrugations may be arranged in the L direction while the other may be arranged in the W direction. FIG. 18 provides a summary of properties and details related to the embodiment of FIGS. 13 and 14.

FIGS. 15-17 illustrate core structures with ribbon corrugations arranged in the L direction as well, but with the core structures arranged side by side rather than one on top of the other or one integrated internal the other. FIG. 15 illustrates embodiment 1500 having core structures 200-*t*, 200-*u*. The core structure 200-*t* includes ribbon corrugations 212-*t* defining a plurality of end facets 210-*t*. Core structure 200-*u* includes a plurality ribbon corrugations 212-*u* that define a plurality of end facets 210-*u*.

Embodiment 1600 shown in FIG. 16 includes a slightly modified arrangement at the interface between the core structures 200-*t*, 200-*u* that provides additional surface contact between the end facets 210-*t*, 210-*u*. Embodiment 1700 shown in FIG. 17 includes a different orientation of the hat structures of the ribbon corrugations 212-*u* relative to the ribbon corrugations 212-*t*. The arrangement of ribbon corrugations shown in embodiment 17 provides a different amount of surface contact between the core structures 200-*t*, 200-*u* and contact at different locations as compared to the embodiments 1500, 1600.

While the hat structures shown in FIGS. 11-17 have a specific size, shape, spacing, etc., and other embodiments may provide different sizes, shapes, orientations, and spacing for the hat structures of the ribbon corrugation or the ribbon corrugation generally to provide different cell densities and other features, properties, and functions for the various core structures and how those core structures are spliced together. FIG. 18 provides a summary of properties and details related to the embodiment of FIGS. 15-17.

FIG. 18 illustrates a chart of characteristics for splicing together composite core structures with different cell sizes. The left hand column lists features for each of the embodiments shown in FIGS. 4-17. A separate column is provided for each of the embodiments of FIGS. 4-17. For example, FIG. 4 is a L-type splice wherein the core has a hexagonal shaped cell with the large core type being a ribbon type and the small core type being a wound type. The edge for each of the large and small core types is irregular. The joining may be done by adhesive. The small cell proportion is fixed. That is, the fixed small cell size is substantially one half of the large cell size not taking into account the cell wall thickness variations. The location of tolerance is in the L direction, whereas in the W direction there is direct contact. The small core can be located with a variation with respect to the large cell core parallel to the L direction. The bond area percentage is the same as the ribbon to ribbon cocure area for the small cell core or at 100%. The permeability percentage is roughly 10 to 50. The embodiment does not provide joint stabilization. In contrast, the embodiment of FIG. 11 is an L-splice type with a flex core and the large and small core types are ribbon. The edge is straight and joining is provided by either adhesive or co-cure. The embodiment of FIG. 11 has a fixed small cell proportion. There is location tolerance in the L direction and contact in the W direction. The bond area percentage is about 80, with permeability of about 120 and no joint stabilization.

The footnotes shown below the chart of FIG. 18 provide additional details and conditions for some of the features listed in the chart.

Figure 19:
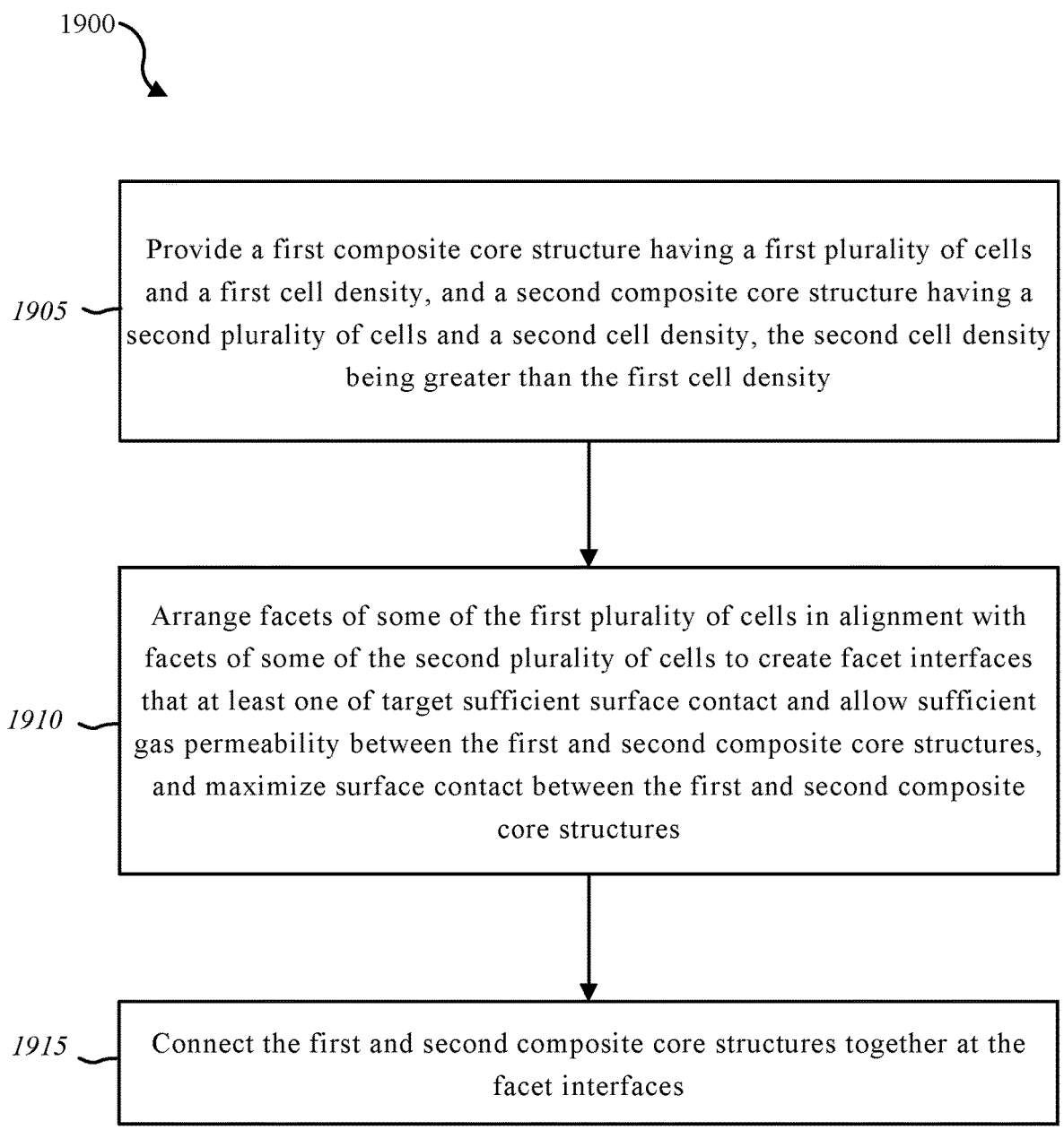
FIG. 19 is a flow diagram showing steps of an example method in accordance with the present disclosure.

FIG. 19 illustrates an example method 1900 in accordance with the present disclosure. The method 1900 may include, at block 1905, providing a first composite core structure having a first plurality of cells and a first cell density, and a second composite core structure having a second plurality of cells and a second cell density. The second cell density is greater than the first cell density. Block 910 includes arranging facets of some of the first plurality of cells in alignment with facets of some of the second plurality of cells to create facet interfaces that maximize surface contact between the first and second composite core structures. Block 915 includes connecting the first and second deposit core structures together at the facet interfaces. Connecting the first and second composite core structures together may include bonding with an adhesive. Connecting the first and second composite core structures together may include creating a connection during cross-linking of polymer materials with the curing of the first and second composite core structures. Forming the first and second composite core structures may include wrapping separate mandrels with composite materials and positioning the wrapped mandrels in contact with each other. At least some of the first and second composite core structures may be formed by connecting together a plurality of ribbon corrugations of pre-shaped composite material.

There are many types of core designs that are possible in addition to those illustrated in the Figures. For example, the core designs may be an over-expanded OX core, reinforced stabilized core, double flex core and noise reducing core. Furthermore, the cores may be made from different materials in addition to or in combination with composite materials.

Unless otherwise explained, any technical terms used herein have the same meaning as commonly understood by one of ordinary skill in the. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described herein. The term "comprises" means "includes." All publications, patent applications, patents, and other references mentioned herein are incorporated by reference in their entirety for all purposes. The materials, methods, and examples are illustrative only and not intended to be limiting.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. Often, the width of an object is transverse the object's length.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

What is claimed is:

1. A method of assembling a core structure assembly, the method comprising:
    providing a first composite core structure having a first plurality of cells and a first cell size, and a second composite core structure having a second plurality of cells and a second cell size, the second cell size being greater than the first cell size, wherein the first plurality of cells and the second plurality of cells each have a hexagonal cross-sectional shape and a centerline, wherein the first and second composite core structures are formed from a plurality of interconnected ribbons of composite material, wherein the plurality of interconnected ribbons are arranged in a length direction and a width direction;
    arranging facets of some of the first plurality of cells in alignment with facets of some of the second plurality of cells to create facet interfaces that maximize surface contact between the first and second composite core structures, wherein an interconnected ribbon of composite material of the plurality of interconnected ribbons of composite material forms an end facet of the second plurality of cells and has a modified shape such that a plurality of cells of the second plurality of cells have additional end facets that maximize surface contact between the first and second composite core structures and do not have the hexagonal cross-sectional shape; and
    connecting the first and second composite core structures together at the facet interfaces.

2. The method of claim 1, wherein connecting the first and second composite core structures together includes bonding with an adhesive.

3. The method of claim 1, wherein connecting the first and second composite core structures together includes creating a connection by cross-linking polymer materials and curing the first and second composite core structures.

4. The method of claim 3, further comprising forming the first and second composite core structures by wrapping separate mandrels with composite materials and positioning the wrapped mandrels in contact with each other.

5. The method of claim 1, further comprising forming at least one of the first and second composite core structures by connecting together a plurality of ribbon corrugations of composite material.

6. The method of claim 1, further comprising preparing the facets for bonding by removing mold release chemicals from the facets.

7. The method of claim 1, further comprising arranging facets of at least some of the first plurality of cells in alignment with facets of at least some of the second plurality of cells to create facet interfaces that provide surface contact and allow gas permeability between the first and second composite core structures.

* * * * *